US012795064B2

(12) United States Patent
Tan et al.

(10) Patent No.: US 12,795,064 B2
(45) Date of Patent: Nov. 10, 2026

(54) SYSTEM AND METHOD OF AUTOMATICALLY CONFIGURING MIXED REALITY GLASSES AND DIGITAL DISPLAY DEVICES BASED ON USAGE PATTERNS FOR A MIXED REALITY CONTROL MODULAR COMPUTING DEVICE

(71) Applicant: Dell Products LP, Round Rock, TX (US)

(72) Inventors: Loo Shing Tan, Singapore (SG); Michiel Sebastiaan Emanuel Petrus Knoppert, Amsterdam (NL); Gerald Rene Pelissier, Santa Clara, CA (US); Jarrett Simerson, Northbrook, IL (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 19/195,091

(22) Filed: Apr. 30, 2025

(65) Prior Publication Data

US 2026/0352797 A1 Nov. 5, 2026

(51) Int. Cl.

*H04N 13/398* (2018.01)
*G06F 1/16* (2006.01)
*G06F 1/28* (2006.01)
*G06F 1/3234* (2019.01)
*H04N 21/41* (2011.01)

(52) U.S. Cl.

CPC ........... *H04N 13/398* (2018.05); *G06F 1/163* (2013.01); *G06F 1/1632* (2013.01); *G06F 1/1683* (2013.01); *G06F 1/28* (2013.01); *G06F 1/3265* (2013.01); *H04N 21/4122* (2013.01)

(58) Field of Classification Search

None

See application file for complete search history.

(56) References Cited

U.S. PATENT DOCUMENTS 9,875,075 B1 * 1/2018 VanBlon .............. G06F 3/0485
10,228,564 B2 3/2019 Haseltine
10,445,941 B2 10/2019 Niles
10,914,957 B1 2/2021 Stahl
2018/0316939 A1 11/2018 Todd (Continued)

*Primary Examiner* — Rebecca A Volentine

(74) *Attorney, Agent, or Firm* — Prol Intellectual Property Law, PLLC; H. Kenneth Prol

(57) ABSTRACT

An augmented reality/mixed reality (AR/MR) control modular computing device may comprise a graphics processing unit (GPU) operatively coupled to AR/MR glasses for the display of projected images and to a digital display device for the display of digital images, and a hardware processor executing machine readable code instructions to gather power state telemetry, executing software telemetry data, usage telemetry data and location telemetry data for the AR/MR control modular computing device to determine that the software application operational profile indicates that a user is working with the AR/MR control modular computing device with executing software applications, operatively coupled input/output devices, and environmental conditions, and power conditions to determine a display devices configuration selected orchestrating display of generated image display data with the AR/MR glasses alone, a digital display device alone, or both the AR/MR glasses and the digital display device simultaneously.

20 Claims, 13 Drawing Sheets

(56) References Cited

U.S. PATENT DOCUMENTS

| | | | | |
|---|---|---|---|---|
| 2019/0116321 | A1 | 4/2019 | Grimm | |
| 2019/0311512 | A1* | 10/2019 | VanBlon | G06F 3/011 |
| 2020/0041800 | A1 | 2/2020 | Haseltine | |
| 2021/0283496 | A1 | 9/2021 | Mandella | |
| 2022/0326841 | A1 | 10/2022 | Davis | |

* cited by examiner

SYSTEM AND METHOD OF AUTOMATICALLY CONFIGURING MIXED REALITY GLASSES AND DIGITAL DISPLAY DEVICES BASED ON USAGE PATTERNS FOR A MIXED REALITY CONTROL MODULAR COMPUTING DEVICE

FIELD OF THE DISCLOSURE

The present disclosure generally relates to augmented reality (AR) or mixed reality (MR) glasses or headsets that operatively couple with an information handling system to display media to a user along with external digital display devices for the information handling system. The present disclosure more specifically relates to a system and method for continuously and automatically adjusting the set configuration of display devices in current use to include AR/MR glasses alone, an external digital display alone, or a combination of both, based on current and routinely monitored operational telemetry, user interaction and usage data, environmental sensors and ongoing execution of software and firmware applications at an AR/MR control modular computing device that orchestrates the display of projected images via the AR/VR glasses and potentially, the display of digital images via the external digital display device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be operatively or wirelessly coupled to a digital display device, such as AR/MR glasses, for output of images or sound of digital media for a user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
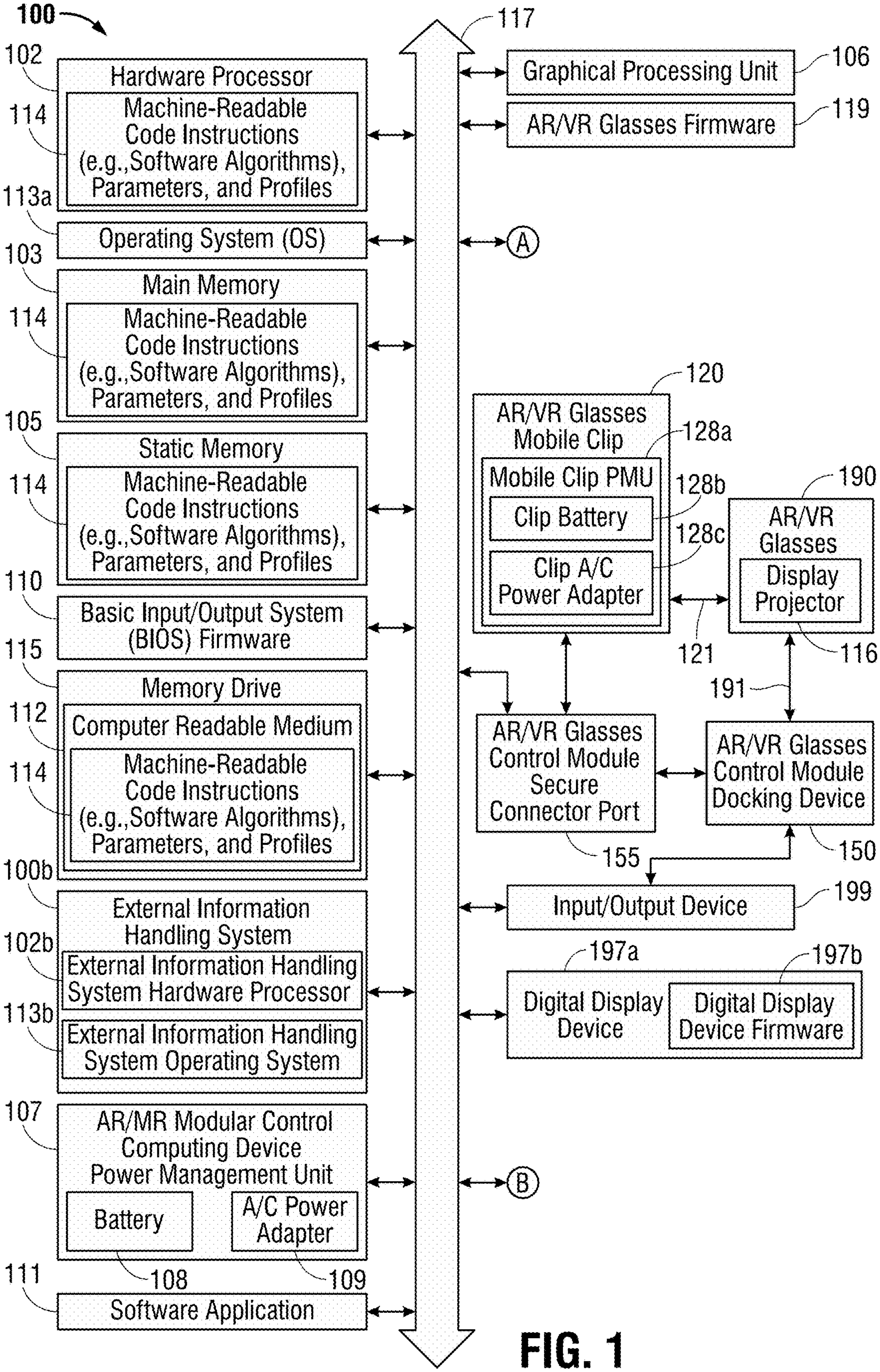
FIG. 1 is a block diagram illustrating an augmented reality/mixed reality (AR/MR) control modular computing device executing machine readable code instructions to generate image display data and orchestrate the display of AR/MR images via operably coupled AR/MR glasses and interchangeably couplable with a AR/MR glasses mobile clip device or a docking station according to an embodiment of the present disclosure.
Figure 1:
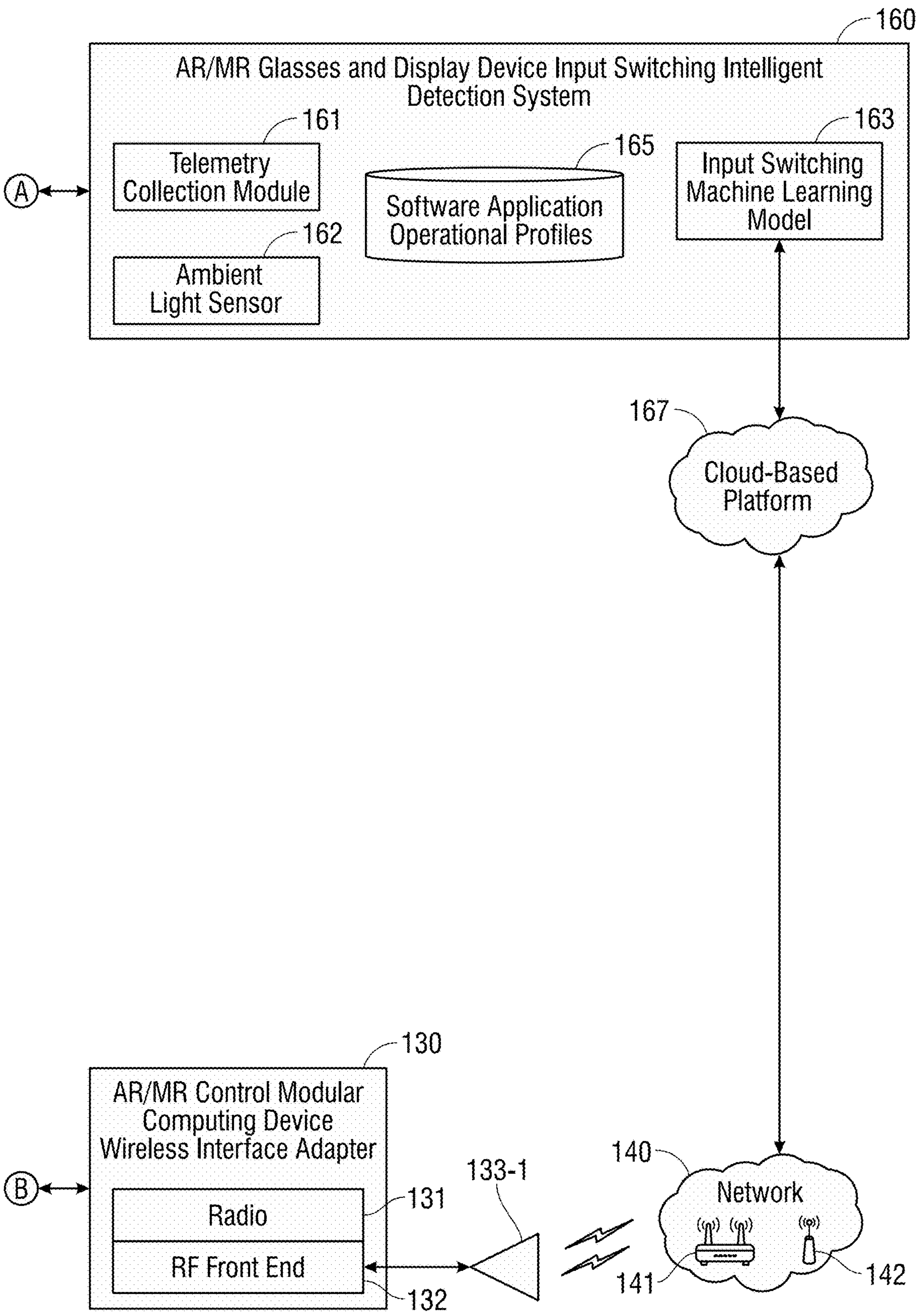

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

As computing processing capabilities grow, so too does a need for more room to display content for user interaction, such as across a plurality of digital display devices, for example. Another solution to such a need is to combine digital display devices with augmented reality or mixed reality (AR/MR) glasses within a user workspace environment that can further display holographic projected images of digital content, either in combination with, or in place of digital display devices such as computer monitors. Simultaneously, changes in working environments require that users be flexible to work in different locales, such as within the office, the home, public spaces, or on the move meaning user workspace environments may change. Users desire the same computing experience and level of privacy that they enjoy in more controlled environments, such as their home or their office, across each of these potential working locales. Use of AR/MR glasses can provide private, repeatable, location independent user experiences, and relieve physical world limitations, such as screen sizes of physical screens.

Using AR/MR glasses allows users to organize a virtual or mixed reality workspace in the user workspace environment around themselves, projected on top of the real world. Interactions in this user workspace environment with the virtual workspace may also use familiar peripherals such as a keyboard, touchpad, and a mouse, for easy adoption and support for existing applications. AR/MR glasses further allow users to visualize their virtual workspace in a format only viewable by the user themselves, allowing them to work, or enjoy a movie in privacy anywhere. In some embodiments of the present disclosure, such portability and security are provided for with an ecosystem of devices for various user workspace environments that include AR/MR glasses, an AR/MR glasses mobile clip device for mobile use of the AR/MR glasses, an AR/MR control modular computing device docking station for desktop usage, and an AR/MR control modular computing device for generating and orchestrating the display of digital content within the AR/MR glasses.

Current systems employing digital display devices in combination with AR/MR glasses in AR or MR environments for selecting which of these to operate at a given time between a user or virtual workspace are awkward, non-intuitive for users, and may require many steps or workarounds for existing default configurations. Execution of machine readable code instructions the AR/MR glasses and display device input switching intelligent detection system by a hardware processor for the AR/MR control modular computing device of embodiments of the present disclosure address these issues by continuously and automatically adjusting the set configuration of display devices used for image display data in current use to include AR/MR glasses alone, an external digital display alone, or a combination of both. The execution of machine readable code instructions the AR/MR glasses and display device input switching intelligent detection system determines among configurations based on current and routinely monitored operational telemetry for an AR/MR control modular computing device that orchestrates the display of projected images via the AR/MR glasses, the display of digital images via the external digital display device, or both in various embodiments. The determination of a recommended display configuration among the AR/MR glasses or digital display device may be made in one embodiment based on device usage and power state telemetry, software application operational profiles, or detected environment and location readings that indicate the ways in which the user is currently interacting with the ecosystem of devices operatively connected to the AR/MR control modular computing device. In another embodiment, the determination of a recommended display configuration may be made based on recommendations output by a trained input switching machine learning model that has been trained on crowd-sourced operational telemetry and user-selected display configurations across a plurality of AR/MR control modular computing devices.

In each of these embodiments, a hardware processor of an AR/MR control modular computing device may gather telemetry readings to identify all operatively coupled computing devices in ecosystem including any digital display devices, device usage and power state telemetry, including power sources and power levels, a software application operational profile determined based on a list and category of software applications currently executing within an operating system of the AR/MR control modular computing device or other operatively connected information handling system, ambient light sensing (ALS) readings, and location band sensing (LBS) readings. The embodiments incorporating a trained machine learning model may further gather processor and memory resource consumption level readings across the ecosystem of devices, as well as connectivity profiles identifying all input/output (IO) devices operatively coupled to the AR/MR control modular computing device and the types of such connections (e.g., wired or wireless).

In embodiments in which the recommended display configuration is determined based on device usage and power state telemetry, software application operational profiles, and environment and location sensor readings, the hardware processor of the AR/MR control modular computing device may execute machine readable code instructions of the AR/MR glasses and display device input switching intelligent detection system to determine a current power state available for use by the AR/MR control modular computing device and, by extension, the AR/MR glasses. If the power available to the AR/MR control modular computing device is provided solely from a battery source having available power below a threshold low power value, the system may automatically switch to display images solely via the AR/MR glasses that may be the primary and default output device for the AR/MR control modular computing device. For example, this may be appropriate since battery power usage may indicate mobile usage of the AR/MR glasses as well as to conserve power that would otherwise be drawn by the digital display device. In other embodiments, the hardware processor of the AR/MR control modular computing device may also execute machine readable code instructions of the AR/MR glasses and display device input switching intelligent detection system to determine whether the AR/MR glasses and AR/MR control modular computing device are currently operating indoors or outdoors. Determination that the AR/MR glasses and any AR/MR control modular computing device are outdoors may be an indicator of mobile use in which use of a digital display device may be inappropriate or unworkable. This may also automatically switch to display images solely via the AR/MR glasses as the primary and default output device for the AR/MR control modular computing device.

The hardware processor of the AR/MR control modular computing device in embodiments herein may further execute machine readable code instructions of the AR/MR glasses and display device input switching intelligent detection system to determine a software application operational profile describing the current usage pattern when the AR/MR glasses are determined to be powered above a threshold or by AC power and is indoors. Based on the determined software application operational profile describing the current usage pattern of one or more executing software applications, the execution of the machine readable code instructions of the AR/MR glasses and display device input switching intelligent detection system may recommend or automatically switch a display configuration for either display on the AR/MR glasses alone, display on a digital display device alone, or display on a combination of the AR/MR glasses and the digital display device based on this software application operational profile. For example, a privacy mode may be indicated as a classification for an executing software application when the user is viewing sensitive information, has firewalls in place, is transceiving data via a secure virtual private network (VPN), or is located in a secured location such as a secure work campus, for example. In such a scenario, it may be favorable for the user to view such sensitive information in an environment in which other people nearby cannot look over the user's shoulder to view such content, as may be possible when using a digital display device such as a computer monitor. Thus, in a detected privacy mode, the execution of machine readable code instructions of the AR/MR glasses and display device input switching intelligent detection system automatically switches to AR/MR glasses only for display.

As another example, a productivity mode may be indicated as a classification for executing software applications when the user is currently executing the software applications routinely used in the course of business, for example. In such a scenario, it may be favorable for the user to leverage as many devices as possible to view the large amount of data accessed during such work, in order to increase user productivity. In such a scenario, it may be favorable for the user to present image data on both the AR/MR glasses and the digital display device. As yet another example, a sharing or collaboration mode may be indicated as a classification for an executing software application when the user is engaged in a conversation or collaboration with other individuals, via the information handling system, AR/MR control modular computing device, as detected by a microphone or the like, presenting a need for the user to clearly see and make eye contact with these other individuals, for example. In such a scenario, it may be favorable for the user to take off the AR/MR glasses, which may inhibit clear sight of all participants and the ability for the user to make eye contact with outside or remote participants, and present image data on the digital display device instead.

In some cases, only a low battery power may be available, the AR/MR glasses and the AR/MR control module computing device may be located outdoors, or the AR/MR control module computing device or operatively coupled information handling system may be operating in privacy mode such that the input switching machine learning model may recommend usage of the AR/MR glasses alone or may automatically switch presenting image data on the AR/MR glasses alone. In each of these scenarios, the hardware processor of the AR/MR control modular computing device may execute machine readable code instructions of the AR/MR glasses and display device input switching intelligent detection system to orchestrate display of projected images via the AR/MR glasses, and to cease any previously established transfer of data for display at an operatively coupled digital display device. The hardware processor of the AR/MR control modular computing device may then execute machine readable code instructions of the AR/MR glasses firmware to orchestrate the display of projected images generated at a GPU via the display projector of the AR/MR glasses. The hardware processor of the AR/MR control modular computing device may also execute machine readable code instructions of the digital display device firmware or instruct the external information handling system to execute machine readable code instructions of the digital display device firmware to cease the display of digital images generated at the GPU or the external information handling system hardware processor, for example.

In some embodiments, power above a threshold low power value may be available for use at the AR/MR control modular computing device and the AR/MR glasses and AR/MR control modular computing device is located indoors and is operating in a productivity mode or is operatively coupled to an external information handling system operating in productivity mode. This detected combination from monitored usage and power telemetry and other sensor inputs may yield the input switching machine learning model executing to recommend or automatically switch to presenting image data with the AR/MR glasses in combination with the digital display device. In such a scenario, the hardware processor of the AR/MR control modular computing device may execute machine readable code instructions of the AR/MR glasses and display device input switching intelligent detection system to orchestrate display of projected images via the AR/MR glasses simultaneously with the display of digital images via the operatively coupled digital display device. The hardware processor of the AR/MR control modular computing device may then execute machine readable code instructions of the digital display device firmware or instruct the external information handling system to execute machine readable code instructions of the digital display device firmware to display digital images generated at the GPU or the external information handling system hardware processor, for example. The hardware processor of the AR/MR control modular computing device may also execute machine readable code instructions of the AR/MR glasses firmware to display projected images generated at the GPU via the display projector of the AR/MR glasses.

In yet other cases, power above a threshold low power value may be available for use at the AR/MR control modular computing device, the AR/MR glasses and AR/MR control modular computing device are located indoors and is operating in a sharing mode, or is operatively coupled to an information handling system operating in sharing mode. In this embodiments, execution of machine readable code instructions of the input switching machine learning model may recommend usage of or automatically switch to present image data at the digital display device alone. In such scenarios, the hardware processor of the AR/MR control modular computing device may execute machine readable code instructions of the AR/MR glasses and display device input switching intelligent detection system to orchestrate display of digital images via the operatively coupled digital display device alone, and to cease any previously established transfer of data to the AR/MR glasses for display of projected images. The hardware processor of the AR/MR control modular computing device may then execute machine readable code instructions of the digital display device firmware or instruct the external information handling system to execute machine readable code instructions of the digital display device firmware to display of digital images generated at the GPU or the external information handling system hardware processor, for example. The hardware processor of the AR/MR control modular computing device may also execute machine readable code instructions of the AR/MR glasses firmware to cease the display of projected images generated at the GPU via the display projector of the AR/MR glasses.

Turning now to the figures, FIG. 1 illustrates an information handling system 100*a* similar to the information handling systems according to several aspects of the present disclosure. An ecosystem of devices of a mobile user workspace are described in an embodiment herein, which include AR/MR glasses 190, an AR/MR glasses mobile clip device 120 for mobile use of the AR/MR glasses 190, and an information handling system 100*a* operating as the AR/MR control modular computing device for generating and orchestrating the display of digital content within the AR/MR glasses 190 using the display projector electronics 111. The information handling system 100*a* operating as the AR/MR control modular computing device may operatively couple with either the AR/MR glasses mobile clip device 120 for mobile use, or with an AR/MR control modular computing device docking station 150 for stationary or desktop use and to provide enhanced hardware processing resources in embodiments herein. In other aspects of an embodiment, the information handling system 100*a* may operatively couple to a standalone, external information handling system 100*b*, such as a desktop, laptop or tablet computer operating separately from the AR/MR control modular computing device 100*a* to execute code instructions of the operating system 113*b* and to potentially generate and display digital images via the digital display device 197, which may be operatively coupled to both the information handling system 100*b* and the AR/MR control modular computing device 100*a*.

The AR/MR glasses 190 in an embodiment may be operatively coupled to the AR/MR glasses mobile clip device 120, via an AR/MR glasses data and power transfer cord 121 (e.g., Universal Serial Bus (USB)-C cord). In some embodiments, AR/MR glasses mobile clip device 120 may further be operatively coupled to the AR/MR control modular computing device 100*a* via an AR/MR control modular computing device secure connector port 155 formed in the housing of the AR/MR control modular computing device 100*a*. The AR/MR control modular computing device secure connector port 155 is actuatable into a secure mating channel in the housing of the AR/MR control modular computing device 100*a* in some embodiments or on a secure mating rail in other embodiments. In an example embodiment, the AR/MR control modular computing device secure connector port 155 actuated into the secure mating channel may engage with a secure connector pin mount on a secure mating rail of the AR/MR glasses mobile clip device 120 or on the AR/MR control modular computing device docking station 150. The AR/MR control modular computing device 100*a* engages with either the AR/MR control modular computing device docking station 150 or the AR/MR glasses mobile clip device 120 through slidable attachment and detachment with the secure mating channel and the reciprocal secure mating rail. In embodiments herein, the secure mating rail slides into the secure mating channel of the AR/MR control modular computing device 100*a* until the secure connector pin mount aligns with the AR/MR control modular computing device secure connector port being urged into the secure mating channel. In this way, power and communication operative coupling may be established between the AR/MR glasses mobile clip device 120 or the AR/MR control modular computing device docking station 150 and the AR/MR control modular computing device 100*a* in embodiments herein.

The AR/MR glasses 190 in an embodiment may also be operatively coupled to the AR/MR control modular computing device docking station 150, via a AR/MR data and power transfer cord 191 (e.g., Universal Serial Bus (USB)-C cord) during stationary or desktop usage. The AR/MR control modular computing device docking station 150 may further be operatively coupled to the AR/MR control modular computing device 100*a* via the AR/MR control modular computing device secure connector port 155 formed through slidable attachment and detachment of the AR/MR control modular computing device docking station 150 to the AR/MR control modular computing device 100*a*. In this way, the AR/MR control modular computing device docking station 150 and/or the AR/MR control modular computing device 100*a* may operate to control and provide enhanced hardware processing resources to the AR/MR glasses 190. The AR/MR control modular computing device docking station 150 in an embodiment may be operably connected to one or more external input/output devices 199 via wired or wireless connection, for example. The AR/MR control modular computing device 100*a* in an embodiment may draw power via the AR/MR control modular computing device secure connector port 155 formed by mating with the AR/MR control modular computing device docking station 150, via the operatively coupled information handling system 100*b*, or by application of DC voltage via the A/C power adapter 109 or battery 108. The AR/MR glasses 190 in an embodiment may be powered directly via the AR/MR data and power transfer cord 191 from the AR/MR control modular computing device docking station 150 or from the AR/MR glasses mobile clip device 120 via AR/MR data and power transfer cord 121 and either clip battery 128*b* or clip A/C power adapter 128*c*.

A secure connector port cable within the AR/MR control modular computing device secure connector port 155 may be operatively coupled with a bus 117 of the AR/MR control modular computing device 100*a* in an embodiment for the transfer of power and data between the AR/MR control modular computing device 100*a* and the AR/MR control modular computing device docking station 150 or AR/MR glasses mobile clip device 120 in various embodiments herein. Mating of the AR/MR control modular computing device secure connector port 155 engages the plurality of pin ports in the secure connector pin port housing with a plurality of pin contacts within a secure connector pin mount in a secure mating rail of either the AR/MR glasses mobile clip device 120 or the AR/MR control modular computing device docking station 150. This forms an electrically conductive contact for the pin ports within a secure connector pin port housing of the AR/MR control modular computing device 100*a* with either the AR/MR glasses mobile clip device 120 or the AR/MR control modular computing device docking station 150. Such an electrically conductive contact in an embodiment may complete a power or data transfer connection, such as a Universal Serial Bus (USB-C) connection, for example, between the AR/MR control modular computing device 100*a* and the AR/MR glasses mobile clip device 120 or AR/MR control modular computing device docking station 150.

A wired data transfer connection 121 or 191 may be established between the AR/MR glasses 190 and the AR/MR glasses mobile clip device 120 or the AR/MR control modular computing device docking station 150, respectively, for the transfer of display data and location determination data from the AR/MR control modular computing device 100*a* executing machine readable code instructions of software applications 111 or firmware applications 119 generating image display data for transfer to AR/MR glasses via the data transfer connection 121 or 191, directing the display of generated AR/MR images at the display projector 116 of the AR/MR glasses 190 in embodiments herein. For example, the hardware processor 102 or graphical processing unit (GPU) 106 may execute machine readable code instructions of AR/MR glasses firmware 119 or software applications 111 to generate and display AR or MR projected images, via a display projector 116 within the operatively coupled AR/MR glasses 190. In another aspect of an embodiment, the GPU 106 may execute machine readable code instructions of digital display device firmware 197*b* to generate and display digital images, via the digital display device 197*a*. In still other embodiments, the external information handling system hardware processor 102*b* of the external information handling system 100*b* may generate digital images for display via the digital display device 197*a*.

As described herein, current systems employing digital display devices, such as 197*a* in combination with AR/MR glasses, such as 190 in AR or MR environments have system and methods to select which of these display devices to operate at a given time that are awkward, non-intuitive for users, and require many steps or workarounds for existing default configurations. Execution of machine readable code instructions of the AR/MR glasses and display device input switching intelligent detection system 160 of embodiments of the present disclosure address these issues by continuously and automatically adjusting the set configuration of display devices amongst the digital display device 197*a* and AR/MR glasses 190 in current use to include AR/MR glasses 190 alone, an external digital display 197*a* alone, or a combination of both, based on current and routinely monitored operational telemetry, environmental sensors, and ongoing software application execution for an AR/MR control modular computing device 100*a*. In this way, the hardware processor 102*a* of the AR/MR control modular computing device 100*a* automatically orchestrates the display of projected images via the AR/VR glasses 190 and potentially, the display of digital images via the external digital display device 197*a* according to various embodiments herein. The determination of a recommended display configuration and automatic switching to that configuration may be made in one embodiment based on usage and power state telemetry, software application operational profiles, and detected environment and location readings that indicate the ways in which the user is currently interacting with the ecosystem of devices operatively connected to the AR/MR control modular computing device 100*a*. In another embodiment, the determination of a recommended display configuration and automatic switching to that configuration may be made based on recommendations output by a trained input switching machine learning model that has been trained on crowd-sourced operational telemetry and user-selected display configurations across a plurality of AR/MR control modular computing devices, including 100*a*.

The hardware processor 102*a* of the AR/MR control modular computing device 100*a* in an embodiment may execute machine readable code instructions of the telemetry collection module 161 within the AR/MR glasses and display device input switching intelligent detection system 160 at the AR/MR control modular computing device to gather telemetry readings to identify all operatively coupled computing devices in the ecosystem (e.g., 100*b*, 120, 150, 190, 199, and 197*a*). Such telemetry readings may further include power state telemetry, including power sources and power levels available to the AR/MR control modular computing device 100*a* or the AR/MR glasses 190, and a software application operational profile determined based on a list of software applications (e.g., 111) currently executing within an operating system 113*a* of the AR/MR control modular computing device 100*a* or within the external information handling system operating system 113*b* of the operatively connected information handling system 100*b*. Ambient light sensing (ALS) readings may be gathered via an ambient light sensor 162, and location band sensing (LBS) readings may be gathered from the AR/MR modular control computing device wireless interface adapter 130 as it connects wirelessly to a plurality of networks (e.g., 140) to indicate mobility or location of the AR/MR control modular computing device 100*a*.

In some embodiments, the hardware processor 102*a* of the AR/MR control modular computing device 100*a* may further gather resource consumption level readings across the ecosystem of devices, as well as connectivity profiles identifying all input/output (IO) devices operatively coupled to the AR/MR control modular computing device and the types of such connections (e.g., wired or wireless). More specifically, telemetry gathered by the hardware processor 102*a* executing machine readable code instructions 114 of the AR/MR glasses and display device input switching detection system 160 telemetry collection module 161 may identify all processor resources available to the AR/MR control modular computing device 100*a*, via the hardware processor 102*a*, GPU 106, other hardware processors, hardware controllers, or the like within AR/MR control modular computing device 100*a*, the external information handling system hardware processor 102*b*, or any external hardware processors operatively coupled with the AR/MR control modular computing device docking station 150 (e.g., as described in greater detail below with respect to FIG. 2). Telemetry gathered by the hardware processor 102*a* executing machine readable code instructions 114 of the AR/MR glasses and display device input switching detection system 160 telemetry collection module 161 may further identify all memory resources available to the AR/MR control modular computing device 100*a*, via main memory 103, static memory 105, memory drive 115, or any external memory devices, such as that incorporated within or operatively coupled to external information handling system 100*b* or AR/MR control modular computing device 150. Connectivity profiles identifying all input/output (IO) devices 199, digital display devices 197*a*, or AR/MR glasses 190, for example, that are operatively coupled to the AR/MR control modular computing device 100*a* and the types of such connections (e.g., wired or wireless) may also be gathered.

The hardware processor 102*a* of the AR/MR control modular computing device 100*a* in an embodiment may execute machine readable code instructions 114 of the AR/MR glasses and display device input switching intelligent detection system 160 to determine whether the MR/AR glasses 190 are powered on. This may be the first step in determining whether to output images for display to the AR/MR glasses 190 alone, a digital display device 197*a* alone, or a combination of the AR/MR glasses 190 and the digital display 197*a*.

If the AR/MR glasses 190 have been powered on, the hardware processor 102*a* of the AR/MR control modular computing device 100*a* in an embodiment may execute machine readable code instructions 114 of the AR/MR glasses and display device input switching intelligent detection system 160 to determine a current power state available for use by the AR/MR control modular computing device 100*a* and, by extension, the AR/MR glasses 190 which draw power directly from the AR/MR control modular computing device 100*a*. The AR/MR control modular computing device 100*a* may receive power via an internal battery 108, direct connection to a power outlet via an internal USB-C port and alternating current/direct current (AC/DC) power adapter 109, or indirectly from an operatively coupled AR/MR control modular computing device docking station 150, an AR/MR glasses mobile clip device 120, or separate information handling system 100*b*, such as a laptop, tablet, or desktop computer. Each of these sources may be considered when determining available power for the AR/MR control modular computing device 100*a* in embodiments herein. If the power available to the AR/MR control modular computing device is provided solely from a battery (e.g., 108 or 128*b*) having available power below a threshold low power value, display of images solely via the AR/MR glasses 190 that may be the primary and default output device for the AR/MR control modular computing device 100*a* as a most appropriate display configuration, in that it may indicate mobile usage and may conserve power that would otherwise be drawn by the digital display device 197*a*. Such a threshold low power value in an embodiment may be, for example, 50%, 75%, or 80%, although it is contemplated that any value above 50% may comprise the threshold low power value, and may be adjustable by a manufacturer of the AR/MR glasses, or a user in settings.

If the power available to the AR/MR control modular computing device 100*a* is provided either directly or indirectly via an AC/DC power adapter (e.g., 109) plugged into a power outlet, or by a battery (e.g., 108 or 128*b*) having remaining power above the threshold low power value, the hardware processor 102*a* of the AR/MR control modular computing device 100*a* in an embodiment may execute machine readable code instructions 114 of the AR/MR glasses and display device input switching intelligent detection system 160 to determine whether the AR/MR glasses 190 and AR/MR control modular computing device 100*a* are currently operating indoors or outdoors. This may be determined through ambient light sensing, via ambient light sensor 162, to identify brighter light indicating outdoor usage, or through local band sensing, via AR/MR control modular computing device wireless interface adapter 130, indicating that the AR/MR control modular computing device 100*a* is on the move or currently in mobile use or at an outside location. In other words, determination that the AR/MR control modular computing device 100*a* is outdoors may be an indicator of mobile use in which use of a digital display device 197*a* may be inappropriate or unworkable. If the AR/MR control modular computing device 100*a* is determined to be outdoors, the display of projected images solely via the AR/MR glasses 190 may be preferrable. This may not be otherwise determined from the AR/MR control modular computing device 100*a* operating with the AR/MR glasses 190 without execution of the machine readable code instructions 114 of the AR/MR glasses and display device input switching intelligent detection system 160.

If the AR/MR control modular computing device 100*a* is determined to be indoors, the hardware processor 102*a* of the AR/MR control modular computing device 100*a* in an embodiment may execute machine readable code instructions 114 of the AR/MR glasses and display device input switching intelligent detection system 160 to determine a software application operational profile within a software application operation profiles database 165 describing the current usage pattern of executing software applications 111 and classifications of those software applications 111 depending on detected usage telemetry such as with microphones, wireless or wired usage with other collaborative information handling systems, simultaneous execution of other software applications (e.g., a slide presentation software in presentation mode or a teleconferencing application) and the like. Execution of machine readable code instructions 114 of the AR/MR glasses and display device input switching intelligent detection system 160 may recommend a display configuration and automatically switch to that recommended display configuration based on this software application operational profile and the detected usage telemetry. Examples of software application operational profiles classifications from database 165 for executing software applications 111 and usage telemetry data in embodiments may include privacy mode, productivity mode, and sharing or collaboration mode, as described in greater detail below with respect to FIG. 5. These are only a few examples, and it is contemplated that any mode classifications for any usage pattern that tends toward usage of the AR/MR glasses 190 alone, the digital display 197*a* alone, or a combination of the two based on the executing software applications and usage telemetry data may be used to determine a recommended display configuration in various embodiments herein.

A privacy mode may be indicated for an executing software application generating image data for display when the user is viewing sensitive information, has firewalls in place, is transceiving data via a secure virtual private network (VPN), or is located in a secured location such as a secure work campus, for example. Each of these indications from usage telemetry data may be listed, for example, in a privacy mode profile stored in the software application operational profiles 165 for a particular software application 111 at the AR/MR control modular computing device 100*a* in an embodiment. The hardware processor 102*a* of the AR/MR control modular computing device 100*a* may execute machine readable code instructions 114 of the AR/MR glasses and display device input switching intelligent detection system 160 in an embodiment to compare the list and category of software applications 111 currently executing within the operating system 113*a* of the AR/MR control modular computing device 100*a* or in the operatively coupled external information handling system operating system 113*b* of the operably connected external information handling system 100*b* to these privacy mode usage telemetry indicators within the privacy mode profile, and determine that the AR/MR control modular computing device 100*a* is currently operating in the privacy mode if a threshold number of privacy mode usage telemetry indicators within the privacy mode profile are met, for example. In such a scenario, it may be favorable for the user to view such sensitive information in an environment in which other people nearby cannot look over the user's shoulder to view such content, as may be possible when using a digital display device 197*a* such as a computer monitor. Thus, upon determination that the AR/MR control modular computing device 100*a* is currently operating in a designated privacy mode, the display of projected images via the AR/MR glasses 190 alone may be most appropriate, to inhibit viewing of the sensitive data via a digital display device 197 by outside viewers.

A productivity mode may be indicated for an executing software application generating image data for display when the user is currently executing software applications 111 routinely used in the course of business, for example. A productivity mode profile stored in the software application operational profiles 165 at the AR/MR control modular computing device 100*a* in an embodiment may include a list of such software applications 111, such as Microsoft® Outlook®, Power Point®, Word®, computer programming applications, production testing applications, database business management platforms, or customer relation management platforms, for example. The hardware processor 102*a* of the AR/MR control modular computing device 100*a* may execute machine readable code instructions 114 of the AR/MR glasses and display device input switching intelligent detection system 160 in an embodiment to compare the list and category of software applications 111 currently executing within the operating system 113*a* of the AR/MR control modular computing device 100*a* or within the external information handling system operating system 113*b* of an operably connected external information handling system 100*b* to these productivity mode software applications within the productivity mode profile, and determine that the AR/MR control modular computing device 100*a* is currently operating in the productivity mode if a threshold number of productivity mode usage telemetry indicators within the productivity mode profile are met, for example. In such a scenario, it may be favorable for the user to leverage as many I/O devices (e.g., 199, 190 and 197*a*) as possible to view and interact with the large amount of data accessed during such work, in order to increase user productivity. This may present a favorable environment for the use of both the AR/MR glasses 190 and the digital display device 197*a*.

A sharing or collaboration mode may be indicated for an executing software application generating image data for display when the user is engaged in a conversation or collaboration with other individuals such as by a microphone or camera or when executed along with a teleconference or presentation software application, via the external information handling system 100*b* or AR/MR control modular computing device 100*a*, presenting a need for the user to clearly see and make eye contact with these other individuals, for example. This may be the case if the user is currently executing software applications 111 for remote meeting participation, such as Microsoft® Teams®, or Zoom®, for example. Each of such remote meeting participation software applications in an embodiment may be listed within a sharing mode profile stored at the software application operational profiles 165 or the AR/MR control modular computing device 100*a* in an embodiment. The hardware processor 102*a* of the AR/MR control modular computing device 100*a* may execute machine readable code instructions 114 of the AR/MR glasses and display device input switching intelligent detection system 160 in an embodiment to compare the list of software applications 111 currently executing within the operating system 113*a* of the AR/MR control modular computing device 100*a* or within the external information handling system operating system 113*b* of an operably connected external information handling system 100*b* to these sharing mode software applications within the sharing mode profile, and determine that the AR/MR control modular computing device 100*a* is currently operating in the sharing mode if a threshold number of sharing mode usage telemetry indicators within the sharing mode profile are met, for example. In such a scenario, it may be favorable for the user to take off the AR/MR glasses 190, which may inhibit clear sight of all participants and the ability for the user to make eye contact with outside or remote participants. Thus, upon determination that the AR/MR control modular computing device 100*a* is currently operating in a designated sharing mode, the display of projected images via the display device 197*a* alone may be preferrable, due to the likelihood that the user will remove the AR/MR glasses 190 during execution of such remote meeting participation software applications.

As described herein, the determination as to which display configuration to employ in any given circumstances, as described by the usage and power telemetry gathered by the telemetry collection module 161 in an embodiment, may also be made through the use of a trained input switching machine learning model 163. The hardware processor 102*a* of the AR/MR control modular computing device 100*a* in such an embodiment may execute machine readable code instructions 114 of the AR/MR glasses and display device input switching intelligent detection system 160 to input the usage and power telemetry readings gathered by the telemetry collection module 161 into a trained input switching machine learning model 163. Such an input switching machine learning model 163 in an embodiment may be trained in a cloud-based platform 167 using telemetry readings crowd-sourced across a plurality of users of AR/MR control modular computing devices (such as 100*a*), for example. The telemetry readings gathered by the telemetry collection module 161 in an example embodiment, as well as then-current display configurations (e.g., AR/MR glasses 190 alone, digital display 197*a* alone, or combination of both) may be routinely transmitted to such a cloud-based platform 167 to determine patterns correlating various indicators within such telemetry with trends in user-selected display configurations, for example. These various indicators may include, for example, the power availability, indoor or outdoor location, and software application operational profiles described above and in greater detail below with respect to FIG. 5. In some embodiments these indicators may further include the processor and memory resources available for use at the AR/MR control modular computing device 100*a* and connectivity to IO devices 199, 190, and 197*a* also gathered in telemetry by telemetry collection module 161. Upon training of the input switching machine learning model 163 at the cloud-based platform 167, the model 163 may be transmitted to the AR/MR control modular computing device 100*a* via a network connection (e.g., via 140). The hardware processor 102*a* of the AR/MR control modular computing device 100*a* in an embodiment may then input all usage and power telemetry and other data for location, mobility, executing software applications 111, device connectivity, or the like gathered by the telemetry collection module 163 above into the input switching machine learning model 163 to predict a recommended display configuration.

The hardware processor 102*a* of the AR/MR control modular computing device 100*a* in an embodiment may execute machine readable code instructions 114 of the trained input switching machine learning model 163 to output a recommended display configuration. As described herein, the recommended display configuration may include display of projected images via the AR/MR glasses 190 alone, display of digital images via the digital display 197*a* alone, or a combination of both. The input switching machine learning model 163 may output such a determined recommended display configuration based on a prediction of the user's preference of display, given the operational telemetry describing the ecosystem of connected IO devices 190, 197*a*, 199, power, processor, and memory availability, software application operational profiles describing current usage patterns of software applications 111, and location of the AR/MR modular computing device 100*a*, for example.

In an embodiment, low battery power may be available, the AR/MR control module computing device 100*a* and AR/MR glasses 190 may be located outdoors as detected by execution of machine readable code instructions of the AR/MR glasses and display device input switching intelligent detection system 160. In such as case, the AR/MR control module computing device 100*a* or operatively coupled information handling system 100*b* may be operating in privacy mode, or the input switching machine learning model 163 may recommend usage of the AR/MR glasses 190 alone. In an embodiment, the hardware processor 102*a* of the AR/MR control modular computing device 100*a* may execute machine readable code instructions 114 of the AR/MR glasses and display device input switching intelligent detection system 160 to orchestrate automatically switching the display of projected images to the AR/MR glasses 190, and to cease any previously established transfer of data for display at an operatively coupled digital display device 197*a*. The hardware processor 102*a* of the AR/MR control modular computing device 100*a* may then execute machine readable code instructions 114 of the AR/MR glasses firmware 119 to orchestrate the display of projected images generated at GPU 106 via the display projector 116 of the AR/MR glasses 190. The hardware processor 102*a* of the AR/MR control modular computing device 100*a* may also execute machine readable code instructions 114 of the digital display device firmware 197*b* or instruct the external information handling system 100*b* to execute machine readable code instructions of the digital display device firmware 197*b* to cease the display of digital images generated at GPU 106 or the external information handling system hardware processor 102*b*, for example.

In some embodiments, power above a threshold low power value may be available for use at the AR/MR control modular computing device 100*a* and AR/MR glasses 190 that are located indoors and is operating in a productivity mode, or is operatively coupled to an external information handling system 100*b* operating in productivity mode as detected by execution of machine readable code instructions of the AR/MR glasses and display device input switching intelligent detection system 160. In such as case, the input switching machine learning model 163 may recommend usage of the AR/MR glasses 190 in combination with the digital display device 197*a*. In an embodiment, the hardware processor 102*a* of the AR/MR control modular computing device 100*a* may execute machine readable code instructions 114 of the AR/MR glasses and display device input switching intelligent detection system 160 to orchestrate automatically switching to display projected images via the AR/MR glasses 190 simultaneously with the display of digital images via the operatively coupled digital display device 197*a*. The hardware processor 102*a* of the AR/MR control modular computing device 100*a* may then execute machine readable code instructions 114 of the digital display device firmware 197*b* or instruct the external information handling system 100*b* to execute machine readable code instructions of the digital display device firmware 197*b* to display digital images generated at GPU 106 or the external information handling system hardware processor 102*b*, for example. The hardware processor 102*a* of the AR/MR control modular computing device 100*a* may also execute machine readable code instructions 114 of the AR/MR glasses firmware 119 to display projected images generated at GPU 106 via the display projector 116 of the AR/MR glasses 190.

In other embodiments, power above a threshold low power value may be available for use at the AR/MR control modular computing device 100*a* and AR/MR glasses 190 that are located indoors and is operating in a sharing mode, or is operatively coupled to an information handling system 100*b* operating in sharing mode as detected by execution of machine readable code instructions of the AR/MR glasses and display device input switching intelligent detection system 160. In such as case, the input switching machine learning model 163 may recommend usage of the digital display device 197*a* alone. In an embodiment, the hardware processor 102*a* of the AR/MR control modular computing device 100*a* may execute machine readable code instructions 114 of the AR/MR glasses and display device input switching intelligent detection system 160 to orchestrate automatically switching the display of digital images via the operatively coupled digital display device 197*a* alone, and to cease any previously established transfer of data to the AR/MR glasses 190 for display of projected images. The hardware processor 102*a* of the AR/MR control modular computing device 100*a* may then execute machine readable code instructions 114 of the digital display device firmware 197*b* or instruct the external information handling system 100*b* to execute machine readable code instructions of the digital display device firmware 197*b* to display of digital images generated at GPU 106 or the external information handling system hardware processor 102*b*, for example. The hardware processor 102*a* of the AR/MR control modular computing device 100*a* may also execute machine readable code instructions 114 of the AR/MR glasses firmware 119 to cease the display of projected images generated at GPU 106 via the display projector 116 of the AR/MR glasses 190.

As described herein, the trained input switching machine learning model 163 in an embodiment may be trained based on crowd-sourced data indicating previous user preferences for display configurations in various settings described by telemetry data such as that gathered by the telemetry collection module 161. If the user has manually changed the configuration suggested by the trained input switching machine learning model 163, this may indicate a need to retrain the model 163 at the cloud-based platform 167. As such, if the user has manually changed the configuration, the hardware processor 102*a* of the AR/MR control modular computing device 100*a* may execute machine readable code instructions 114 of the AR/MR glasses and display device input switching intelligent detection system 160 to transmit telemetry readings input into the input switching machine learning model 163, outputted recommended display configuration, and user manual changes to the cloud-based machine learning training platform 167 to retrain machine learning model 163. Upon such a retraining of the input switching machine learning model 163 at the cloud-based platform 167, the network interface adapter 130 of the AR/MR control modular computing device 100*a* in an embodiment may receive and store a retrained and updated machine learning model for future use in more accurately predicting a recommended display configuration.

In the embodiments described herein, an information handling system 100*a* or 100*b* includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100*a* or 100*b* may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 141, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100*a* or 100*b* may operate in the capacity of a client computer in a server-client network environment, or as a peer computer system in a peer-to-peer (or distributed) network environment. In an embodiment, the information handling system 100*a* or 100*b* may be implemented using electronic devices that provide voice, video, or data communication. For example, an information handling system 100*a* or 100*b* may be any mobile or other computing device capable of executing a set of instructions (sequential or otherwise) that specify actions to be taken by that machine. Further, while a single information handling system 100*a* or 100*b* is illustrated, the term "system" shall also be taken to include any collection of systems or sub-systems that individually or jointly execute a set, or plural sets, of computer readable code instructions to perform one or more computer functions, via one or more hardware processing resources.

The information handling system operating as the AR/MR control modular computing device 100*a* may include main memory 103, (volatile (e.g., random-access memory, etc.), or static memory 105, nonvolatile (read-only memory, flash memory etc.) or any combination thereof), one or more hardware processing resources, such as a hardware processor 102 that may be a central processing unit (CPU), a graphics processing unit (GPU) 106, other hardware controllers, or any combination thereof. Additional components of the information handling system operating as the AR/MR control modular computing device 100*a* may include one or more storage devices such as static memory 105 or drive unit 115. The information handling system operating as the AR/MR control modular computing device 100*a* may include or interface with one or more communications ports for communicating with external devices, as well as one or more input/output (IO) devices 199, a video/graphics digital display device 197*a*, or any combination thereof. Portions of an information handling system 100*a* or 100*b* may themselves be considered information handling systems 100*a* or 100*b*.

Information handling system operating as the AR/MR control modular computing device 100*a* may include devices or modules that embody one or more of the hardware devices or hardware processing resources executing machine readable code instructions for one or more systems and modules. The information handling system operating as the AR/MR control modular computing device 100*a* may execute machine readable code instructions (e.g., software or firmware algorithms), parameters, and profiles 114 that may operate on servers or systems, remote data centers, or on-box in individual client information handling systems according to various embodiments herein. In some embodiments, it is understood any or all portions of machine readable code instructions (e.g., software or firmware algorithms), parameters, and profiles 114 may operate on a plurality of information handling systems operating as the AR/MR control modular computing device 100*a*.

The information handling system operating as the AR/MR control modular computing device 100*a* may include the hardware processor 102 such as a central processing unit (CPU) or other hardware processing resources on the AR/MR control modular computing device 100*a*. Any of the hardware processing resources may operate to execute machine readable code instructions 114 that are either firmware or software code. The hardware processor 102 in the AR/MR control modular computing device 100*a* may comprise a vector CPU or multi-vector CPU or may be a graphics processing unit (GPU) 106 or other hardware processing resources.

Moreover, the information handling system operating as the AR/MR control modular computing device 100*a* may include memory such as main memory 103, static memory 105, and disk drive unit 115 (volatile (e.g., random-access memory, etc.), nonvolatile memory (read-only memory, flash memory etc.) or any combination thereof or other memory with computer readable medium 112 storing machine readable code instructions (e.g., software or firmware algorithms), parameters, and profiles 114 executable by the hardware processor 102, GPU 106, or any other hardware processing device. The information handling system 100*a* may also include one or more buses 117 operable to transmit communications between the various hardware components such as any combination of various I/O devices 199, the digital display device 197*a*, as well as between hardware processors 102, GPU 106 or other, the operating system (OS) 113, the basic input/output system (BIOS) 110, the wireless interface adapter 130, or a radio module 131, among other components described herein. In an embodiment, the hardware processor 102, and/or GPU 106 may execute one or more bus drivers in order to transmit this data between the information handling system operating as the AR/MR control modular computing device 100*a* and the input/output devices 199 described herein.

A network interface device 130 of the information handling system operating as the AR/MR control modular computing device 100*a* may be wired or wireless such as shown with wireless interface adapter 130 that can provide wireless connectivity among devices such as with Bluetooth® or to a network 140, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 131, RF front end 132 and antenna 133 is used to communicate with the network 140, via, for example, a Bluetooth® or Bluetooth® Low Energy (BLE) protocols, or other WPAN or WLAN protocols.

In an embodiment, a WAN, WWAN, LAN, and WLAN may each include an AP 141 or base station 142 used to operatively couple the information handling system operating as the AR/MR control modular computing device 100*a*, via a wireless interface adapter 130. In a specific embodiment, the network 140 may include macro-cellular connections via one or more base stations 142 or a wireless AP 141 (e.g., Wi-Fi), or such as through licensed or unlicensed WWAN small cell base stations 142. Connectivity may be via wired or wireless connection. For example, wireless network wireless APs 141 or base stations 142 may be operatively connected to the information handling system operating as the AR/MR control modular computing device 100*a*. Wireless interface adapter 130 may include one or more radio frequency (RF) subsystems (e.g., radio 131) with transmitter/receiver circuitry, modem circuitry, one or more antenna RF front end circuits 132, one or more wireless controller circuits, amplifiers, antennas 133, and other circuitry of the radio 131, such as one or more antenna ports used for wireless communications via multiple radio access technologies (RATs). The radio 131 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system operating as the AR/MR control modular computing device 100*a* or integrated with another wireless network interface capability, or any combination thereof.

In some embodiments, one or more hardware processors or hardware controllers executing software, firmware, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software machine readable code instructions executable by a hardware controller or a hardware processor system. Further, in an exemplary, non-limited embodiment, implementations may include distributed hardware processing, component/object distributed hardware processing, and parallel hardware processing. Alternatively, mixed computer system processing may be constructed to implement one or more of the methods or functionalities as described herein.

The present disclosure contemplates a computer-readable medium 112 that includes machine-readable code instructions, parameters, and profiles 114 or receives and executes instructions, parameters, and profiles 114 responsive to a propagated signal, so that a hardware device connected to a network 140 may communicate voice, video, or data over the network 140. Further, the machine readable code instructions 114 may be transmitted or received over the network 140 via the network interface device or wireless interface adapter 130. The information handling system 100*a* may include a set of instructions 114, that may be executed to cause the AR/MR control modular computing device 100*a* to perform any one or more of the methods or computer-based functions disclosed herein. For example, machine readable code instructions 114 may be executed by a hardware processor 102, GPU 106, or any other hardware processing resource and may include software agents, or other aspects or components used to execute the methods and systems described herein. Various software modules 111 or firmware modules (e.g., AR/MR glasses firmware 119) comprising application machine readable code instructions 114 may be coordinated by an OS 113, and/or via an application programming interface (API) include a unified device API described herein. An example OS 113 may include Windows®, Android®, and other OS types. Example APIs may include Win 32, Core Java API, or Android APIs.

In an embodiment, the information handling system operating as the AR/MR control modular computing device 100*a* may include a disk drive unit 115. The disk drive unit 115 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106, or other microcontroller unit to perform the processes described herein. Similarly, main memory 103 and static memory 105 may also contain a computer-readable medium for storage of one or more sets of machine-readable code instructions, parameters, or profiles 114 described herein. The disk drive unit 115 or static memory 105 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 103, the static memory 105, and/or within the disk drive 115 during execution by the hardware processor 102, or GPU 106 of information handling system 100*a*.

Main memory 103, or other memory of the embodiments described herein may contain computer-readable medium (not shown), such as RAM in an example embodiment. An example of main memory 103 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 105 or on the disk drive unit 115 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system operating as the AR/MR control modular computing device 100*a* may further include a power management unit (PMU) 107 (a.k.a. a power supply unit (PSU)). The PMU 107 may include a hardware controller and executable machine-readable code instructions to manage the power provided to the components of the information handling system operating as the AR/MR control modular computing device 100*a* such as the hardware processor 102 and other hardware components described herein. The PMU 107 may control power to one or more components including the one or more drive units 115, the hardware processor 102 (e.g., CPU), the GPU 106, or other wired I/O devices 199, the AR/MR glasses 190, the digital display device 197*a*, and other components that may require power when a power button has been actuated by a user. In an embodiment, the PMU 107 may monitor power levels and be electrically coupled to the information handling system operating as the AR/MR control modular computing device 100*a* to provide this power. The PMU 107 may be coupled to the bus 117 to provide or receive data or machine-readable code instructions. The PMU 107 may regulate power from a power source such as the battery 108 or AC power adapter 109. In an embodiment, the battery 108 may be charged via the AC power adapter 109 and provide power to the components of the information handling system operating as the AR/MR control modular computing device 100*a*, via wired connections as applicable, or when AC power from the AC power adapter 109 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 112 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
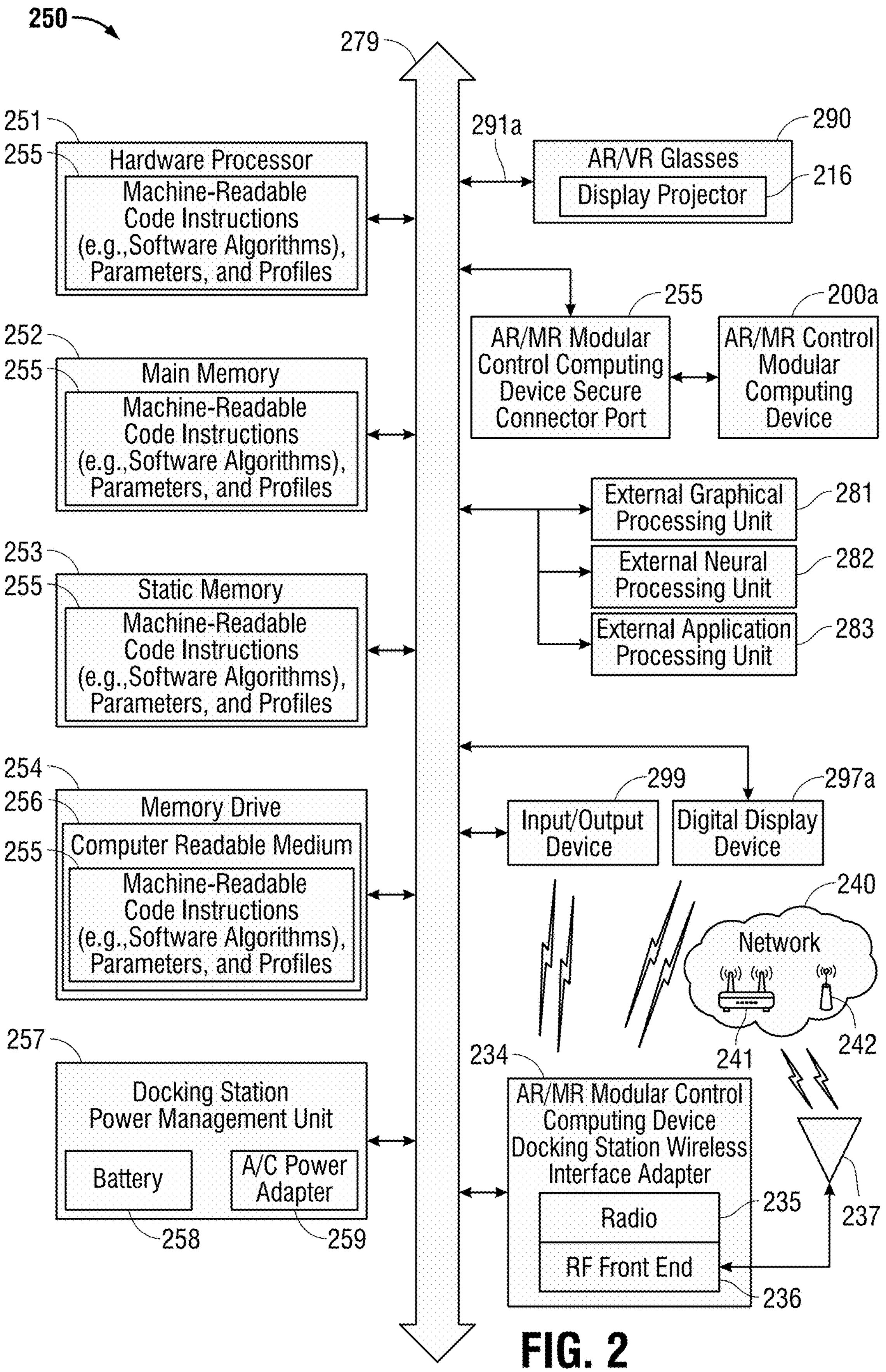
FIG. 2 is a block diagram illustrating an AR/MR control modular computing device docking station couplable with an AR/MR control modular computing device for augmenting hardware processing resources and providing thermal cooling for the AR/MR control modular computing device operating AR/MR glasses according to an embodiment of the present disclosure.

FIG. 2 is a block diagram illustrating an augmented reality/mixed reality (AR/MR) control modular computing device docking station 250 operatively coupled to an AR/MR control modular computing device 200*a* according to an embodiment of the present disclosure. As described herein, the AR/MR glasses 290 in an embodiment may be operatively coupled to the AR/MR control modular computing device docking station 250, via an AR/MR data and power transfer cord 291 (e.g., Universal Serial Bus (USB)-C cord). The AR/MR control modular computing device docking station 250 in an embodiment may further be operatively coupled to the AR/MR control modular computing device 200 via an AR/MR control modular computing device secure connector port 255 engaged through slidable attachment and detachment of a secure mating channel and reciprocal secure mating rail between the AR/MR control modular computing device docking station 250 and the AR/MR control modular computing device 200. The AR/MR control modular computing device docking station 250 in an embodiment may be wired or wirelessly connected to one or more external input/output (I/O) devices 299, including a touch drawing pad, digital display device, keyboard, mouse, or other wired or wireless I/O devices in a user workspace ecosystem.

The AR/MR control modular computing device docking station 250 in an embodiment may include a hardware processor 251 for execution of machine readable code instructions 255 for software applications (e.g., 111 in FIG. 1) and the like in support of an operatively coupled AR/MR control modular computing device 200 for generating digital display data or AR/MR device location data for the AR/MR glasses 290 in an embodiment. The AR/MR control modular computing device docking station 250 may include augmented hardware processing resources onboard such as hardware processor 251 that may be additional graphics processing unit (GPU), neural processing unit (NPU), or application processing unit (APU) in an embodiment. The AR/MR control modular computing device docking station 250 in an embodiment may also be operatively coupled, via communication ports such as Universal Serial Bus (USB) ports (e.g., USB 3.0, USB-C), to one or more external input/output devices 299, digital display device 297*a*, or one or more external augmented hardware processor devices, such as a graphics processing unit (GPU) 281, neural processing unit (NPU) 282, or application processing unit (APU) 283, for example in other embodiments. This may allow the AR/MR control modular computing device 200 in an embodiment to leverage additional processing power of onboard hardware processor 251 or these external augmented hardware processor devices 281, 282, or 283 to maximize performance of the AR/MR glasses 290 for displaying images via display projector circuitry 216 when in use.

In some embodiments, the hardware processor of the AR/MR control modular computing device 200*a* may gather resource consumption level readings across the ecosystem of devices to which it is operatively coupled (e.g., including the AR/MR control modular computing device docking station 250), as well as connectivity profiles identifying all input/output (IO) devices 299 or digital display devices 297*a* operatively coupled to the AR/MR control modular computing device 200*a* and the types of such connections (e.g., wired or wireless). The ecosystem of device operatively coupled to the AR/MR control modular computing device 200*a* may include all devices operatively coupled to the AR/MR control modular computing device docking station 250*a* when the two are mated or operatively coupled with one another. For example, the AR/MR control modular computing device 200*a* may gather telemetry data describing processing resources from the external GPU 281, external NPU 282 and external APU 283 that are made available to the AR/MR control modular computing device 200*a* via its operative coupling with the AR/MR control modular computing device docking station 250*a*. As another example, the AR/MR control modular computing device 200*a* may gather telemetry data describing power resources from the battery 258 or the A/C power adapter 259 that are made available to the AR/MR control modular computing device 200*a* via its operative coupling with the AR/MR control modular computing device docking station 250*a*. In still another example, the AR/MR control modular computing device 200*a* may gather telemetry data describing memory resources from the external main memory 252, static memory 253, or memory drive 254 that are made available to the AR/MR control modular computing device 200*a* via its operative coupling with the AR/MR control modular computing device docking station 250*a*.

The AR/MR control modular computing device 200 in an embodiment may draw power via engagement of the AR/MR control modular computing device secure connector port 255 formed by mating with the AR/MR control modular computing device docking station 250. The docking station battery 258 or docking station A/C power adapter 259 may provide power via the AR/MR control modular computing device secure connector port 255. The AR/MR glasses 290 in an embodiment may be powered directly via the AR/MR glasses data and power transfer cord 291 from the AR/MR control modular computing device docking station 250 as well. A secure connector pin mount cable within the AR/MR control modular computing device docking station 250, may be operatively coupled via electrically conductive contact with secure connector pin connectors within the AR/MR control modular computing device secure connector port 255 to a bus of the AR/MR control modular computing device docking station 279 in an embodiment. This electrical coupling via secure connector pin ports in the AR/MR control modular computing device secure connector port 255 and pin contacts in the reciprocal secure connector pin mount may provide for transfer of power and data between the AR/MR control modular computing device 200 and the AR/MR control modular computing device docking station 250.

The information handling system operating as the AR/MR control modular computing device docking station 250 may include main memory 252, (volatile (e.g., random-access memory, etc.), or static memory 253, nonvolatile (read-only memory, flash memory etc.) or any combination thereof), one or more hardware processing resources, such as a hardware processor 251 that may be a central processing unit (CPU), a graphics processing unit (GPU), other hardware controllers, or any combination thereof, that may augment hardware processing resources for the AR/MR control modular computing device 200. Additional components of the information handling system operating as the AR/MR control modular computing device docking station 250 may include one or more storage devices such as static memory 253 or drive unit 254. The information handling system operating as the AR/MR control modular computing device docking station 250 may include or interface with one or more communications ports for communicating with external devices, as well as one or more input/output (IO) devices 299, a video/graphics digital display device 297*a*, or any combination thereof.

Information handling system operating as the AR/MR control modular computing device docking station 250 may include devices or modules that embody one or more of the hardware devices or hardware processing resources executing machine readable code instructions for one or more systems and modules. The AR/MR control modular computing device docking station 250 may execute machine readable code instructions (e.g., software or firmware algorithms), parameters, and profiles 255 of the docking station adaptable cooling system or other software or firmware applications as with an information handling system that may utilize the AR/MR glasses 290 or any I/O devices 299 or 297*a* when executed by the user. Any of the hardware processing resources, such as hardware processor 251 or hardware controller 276, may operate to execute machine readable code instructions 255 that are either firmware or software code or may augment execution of machine readable code instructions executed with the AR/MR control modular computing device 200. The hardware processor 251 in the AR/MR control modular computing device docking station 250 may comprise a vector CPU or multi-vector CPU or may be a graphics processing unit (GPU) or other hardware processing resource and may execute software or firmware in conjunction with the operably coupled AR/MR control modular computing device 200 in embodiments herein.

Moreover, the information handling system operating as the AR/MR control modular computing device docking station 250 may include memory such as main memory 252, static memory 253, and disk drive unit 254 (volatile (e.g., random-access memory, etc.), nonvolatile memory (read-only memory, flash memory etc.) or any combination thereof or other memory with computer readable medium 256 storing machine readable code instructions (e.g., software or firmware algorithms), parameters, and profiles 255 executable by the hardware processor 251, or any other hardware processing device. The information handling system operating as the AR/MR control modular computing device docking station 250 may also include one or more buses 279 operable to transmit communications between the various hardware components such as any combination of various I/O devices 299 or digital display device 297*a*, as well as between hardware processors 251 or other, the wireless interface adapter 234, or a radio module 235, among other components described herein. In an embodiment, the hardware processor 251 may execute one or more bus drivers in order to transmit this data between the information handling system operating as the AR/MR control modular computing device docking station 250 and the input/output devices 299 described herein.

A network interface device 234 of the information handling system operating as the AR/MR control modular computing device docking station 250 may be wired or wireless such as shown with wireless interface adapter 234 that can provide wireless connectivity among devices or to a network 240, e.g., a wide area network (WAN), a local area network (LAN), wireless local area network (WLAN), a wireless personal area network (WPAN), a wireless wide area network (WWAN), or other network via any wireless protocol. In embodiments described herein, the wireless interface device 234 with its radio 235, RF front end 236 and antenna 237 is used to communicate with the network 240, via, for example, a Bluetooth® or Bluetooth® Low Energy (BLE) protocols, or other WPAN or WLAN protocols.

In an embodiment, a WAN, WWAN, LAN, and WLAN may each include an AP 241 or base station 242 used to operatively couple the information handling system operating as the AR/MR control modular computing device docking station 250, via a wireless interface adapter 234. Wireless interface adapter 234 may include one or more radio frequency (RF) subsystems (e.g., radio 235) with transmitter/receiver circuitry, modem circuitry, one or more antenna RF front end circuits 236, one or more wireless controller circuits, amplifiers, antennas 237, and other circuitry of the radio 235, such as one or more antenna ports used for wireless communications via multiple radio access technologies (RATs). The radio 235 may communicate with one or more wireless technology protocols.

In an embodiment, the wireless interface adapter 234 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WiMAX, WWAN such as 3GPP or 3GPP2, Bluetooth® standards, proprietary RF protocol, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHz, 5 GHZ, or 6 GHz bands which may be shared communication frequency bands with WWAN protocols or Bluetooth® protocols in some embodiments. Wireless interface adapter 234 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 234 can represent an add-in card, wireless network interface module that is integrated with a main board of the information handling system operating as the AR/MR control modular computing device docking station 250 or integrated with another wireless network interface capability, or any combination thereof.

The present disclosure contemplates a computer-readable medium 256 that includes machine-readable code instructions, parameters, and profiles 255 or receives and executes instructions, parameters, and profiles 255 responsive to a propagated signal, so that a hardware device connected to a network 240 may communicate voice, video, or data over the network 240. Further, the machine readable code instructions 255 may be transmitted or received over the network 240 via the network interface device or wireless interface adapter 234. The information handling system operating as the AR/MR control modular computing device docking station 250 may include a set of instructions 255, that may be executed to cause the AR/MR control modular computing device docking station 250 to perform any one or more of the methods or computer-based functions disclosed herein. For example, machine readable code instructions 255 may be executed by a hardware processor 251, or any other hardware processing resource and may include software agents, or other aspects or components used to execute the methods and systems described herein.

In an embodiment, the information handling system operating as the AR/MR control modular computing device docking station 250 may include a disk drive unit 254. The disk drive unit 254 may include machine-readable code instructions, parameters, and profiles 255 in which one or more sets of machine-readable code instructions, parameters, and profiles 255 such as firmware or software can be embedded to be executed by the hardware processor 251 or other hardware processing devices, or other microcontroller units 276 to perform the processes described herein. Similarly, main memory 252 and static memory 253 may also contain a computer-readable medium for storage of one or more sets of machine-readable code instructions, parameters, or profiles 255 described herein. The disk drive unit 254 or static memory 253 also contain space for data storage. Further, the machine-readable code instructions, parameters, and profiles 255 may embody one or more of the methods as described herein. In a particular embodiment, the machine-readable code instructions, parameters, and profiles 255 may reside completely, or at least partially, within the main memory 252, the static memory 253, and/or within the disk drive 254 during execution by the hardware processor 251 of information handling system operating as the AR/MR control modular computing device docking station 250.

Main memory 252, or other memory of the embodiments described herein may contain computer-readable medium (not shown), such as RAM in an example embodiment. An example of main memory 252 includes random access memory (RAM) such as static RAM (SRAM), dynamic RAM (DRAM), non-volatile RAM (NV-RAM), or the like, read only memory (ROM), another type of memory, or a combination thereof. Static memory 105 may contain computer-readable medium (not shown), such as NOR or NAND flash memory in some example embodiments. The applications and associated APIs, for example, may be stored in static memory 253 or on the disk drive unit 254 that may include access to a machine-readable code instructions, parameters, and profiles 255 such as a magnetic disk or flash memory in an example embodiment.

In an embodiment, the information handling system operating as the AR/MR control modular computing device docking station 250 may further include a power management unit (PMU) 257 (a.k.a. a power supply unit (PSU)). The PMU 257 may include a hardware controller and executable machine-readable code instructions to manage the power provided to the components of the information handling system operating as the AR/MR control modular computing device docking station 250 such as the hardware processor 251 and other hardware components described herein. The PMU 257 may control power to one or more components including the one or more drive units 254, the hardware processor 251 or other wired I/O devices 299 or digital display device 297*a* and other components that may require power when a power button has been actuated by a user. In an embodiment, the PMU 257 may monitor power levels and be electrically coupled to the information handling system operating as the AR/MR control modular computing device docking station 250 to provide this power. The PMU 257 may be coupled to the bus 279 to provide or receive data or machine-readable code instructions. The PMU 257 may regulate power from a power source such as the battery 258 or AC power adapter 259. In an embodiment, the battery 258 may be charged via the AC power adapter 259 and provide power to the components of the information handling system operating as the AR/MR control modular computing device docking station 250, via wired connections as applicable, or when AC power from the AC power adapter 259 is removed.

Figure 3A:
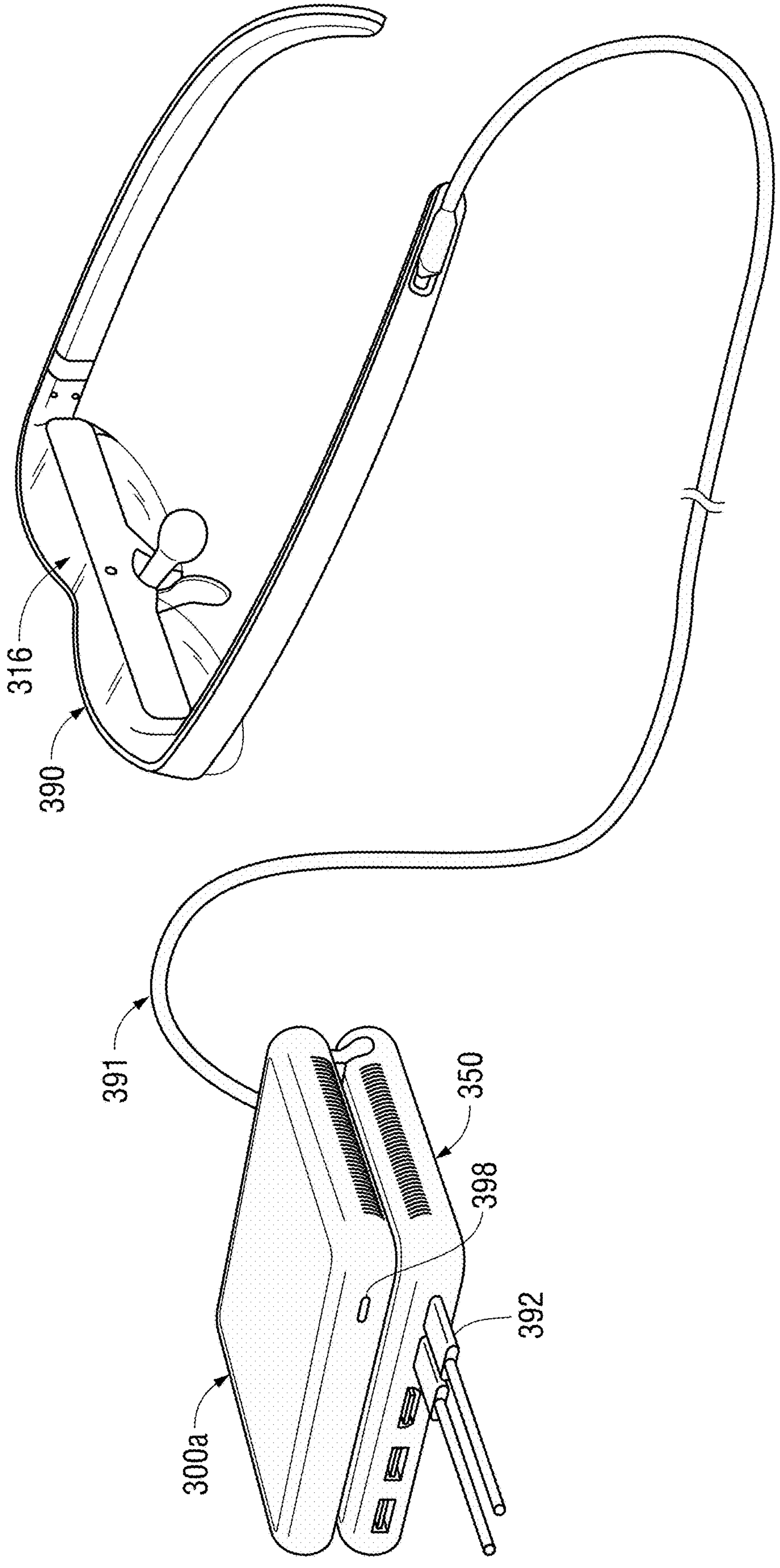
FIG. 3A is a graphical diagram illustrating an AR/MR control modular computing device docking station operably coupled to AR/MR glasses and to an AR/MR control modular computing device according to an embodiment of the present disclosure.

FIG. 3A is a graphical diagram illustrating an augmented reality/mixed reality (AR/MR) control modular computing device docking station 350 operably coupled to AR/MR glasses 390 and to an AR/MR control modular computing device 300 for desktop use in a user workspace according to an embodiment of the present disclosure. The AR/MR control modular computing device docking station 350 is operably coupled to the AR/MR control modular computing device 300 providing supplemental hardware processing resources for control of AR/MR glasses display projector electronics 316 in the AR/MR glasses 390 by the AR/MR control modular computing device 300 through the AR/MR control modular computing device docking station 350 according to an embodiment of the present disclosure. An ecosystem of devices are described herein in FIG. 3A, which include AR/MR glasses 390, an AR/MR control modular computing device 300*a*, and an AR/MR control modular computing device docking station 350. The AR/MR control modular computing device 300*a* is multifunctional in that it operates to generate and orchestrate the display of digital content within the AR/MR glasses 390 as well as for operating other computing functions for a user with I/O devices in a physical desktop user space such as a standalone digital display device, keyboard, mouse, dial or other I/O peripheral device for execution of machine readable code instructions of software or firmware in embodiments herein. This operation in the physical desktop user workspace may be augmented and coordinated with operable coupling of the AR/MR control modular computing device 300 with the AR/MR control modular computing device docking station 350 in embodiments herein. The AR/MR control modular computing device 300 may operatively couple with the AR/MR glasses mobile clip device (not shown) for mobile use, or with an AR/MR control modular computing device docking station 350 for stationary or desktop use via an AR/MR control modular computing device secure connection port between a reciprocal secure mating channel on one side and a secure mating rail on the other side. The AR/MR control modular computing device docking station 350 may provide augmented hardware processing resources, additional ports, additional power supply capabilities, thermal cooling for the AR/MR control modular computing device 300, coordination with one or more I/O devices in the user workspace, and other capabilities expanded for the AR/MR control modular computing device 300 during stationary or desktop use in embodiments herein.

The AR/MR glasses 390 in an embodiment may be operatively coupled to the AR/MR control modular computing device docking station 350, via a AR/MR glasses data and power transfer cord 391 (e.g., Universal Serial Bus (USB)-C cord) having a universal and magnetic detachable cord connector. The universal and magnetic detachable cord connector may operatively and communicatively couple the AR/MR glasses data and power transfer cord 391 to a receiving magnetic glasses power and data port on a temple or arm of the AR/MR glasses, such as the left temple end of the AR/MR glasses 390 as shown in FIG. 3A. It is contemplated that the magnetic glasses power and data port may be located on either or both temples of the AR/MR glasses 390 in various embodiments.

According to embodiments herein, the AR/MR control modular computing device docking station 350 may further be operatively coupled to the AR/MR control modular computing device 300*a* via an AR/MR control modular computing device secure connection port engaged through slidable attachment and detachment within a reciprocal secure mating channel in the AR/MR control modular computing device 300*a* and a secure mating rail of the AR/MR control modular computing device docking station 350. The AR/MR control modular computing device docking station 350 in an embodiment may also include augmented hardware processing resources such as a graphics processing unit (GPU), neural processing unit (NPU), or accelerated processing unit (APU) as described in example embodiments herein. The AR/MR control modular computing device docking station 350 in an embodiment may also be operatively coupled, via communication ports such as USB ports 392 (e.g., USB 3.0, USB-C), to one or more external input/output devices or one or more external augmented hardware processor devices, such as an external GPU, an external NPU, or an external APU, for example. This may allow the AR/MR control modular computing device 300*a* in an embodiment to leverage additional processing power of the AR/MR control modular computing device docking station 350 or of these external augmented hardware processor devices to maximize performance of the AR/MR glasses 390 when in use. The AR/MR control modular computing device 300*a* in an embodiment may draw power via the AR/MR control modular computing device secure connector port engaged by mating with the AR/MR control modular computing device docking station 350, or further by application of DC voltage via the direct power port 398. The AR/MR glasses 390 in an embodiment may be powered directly via the AR/MR glasses data and power transfer cord 391 and the universal and magnetic detachable cord connector operatively coupled with the magnetic glasses power and data port from the AR/MR control modular computing device docking station 350 or from the AR/MR glasses mobile clip device described below with respect to FIGS. 3D, 3E, and 4.

Figure 3B:
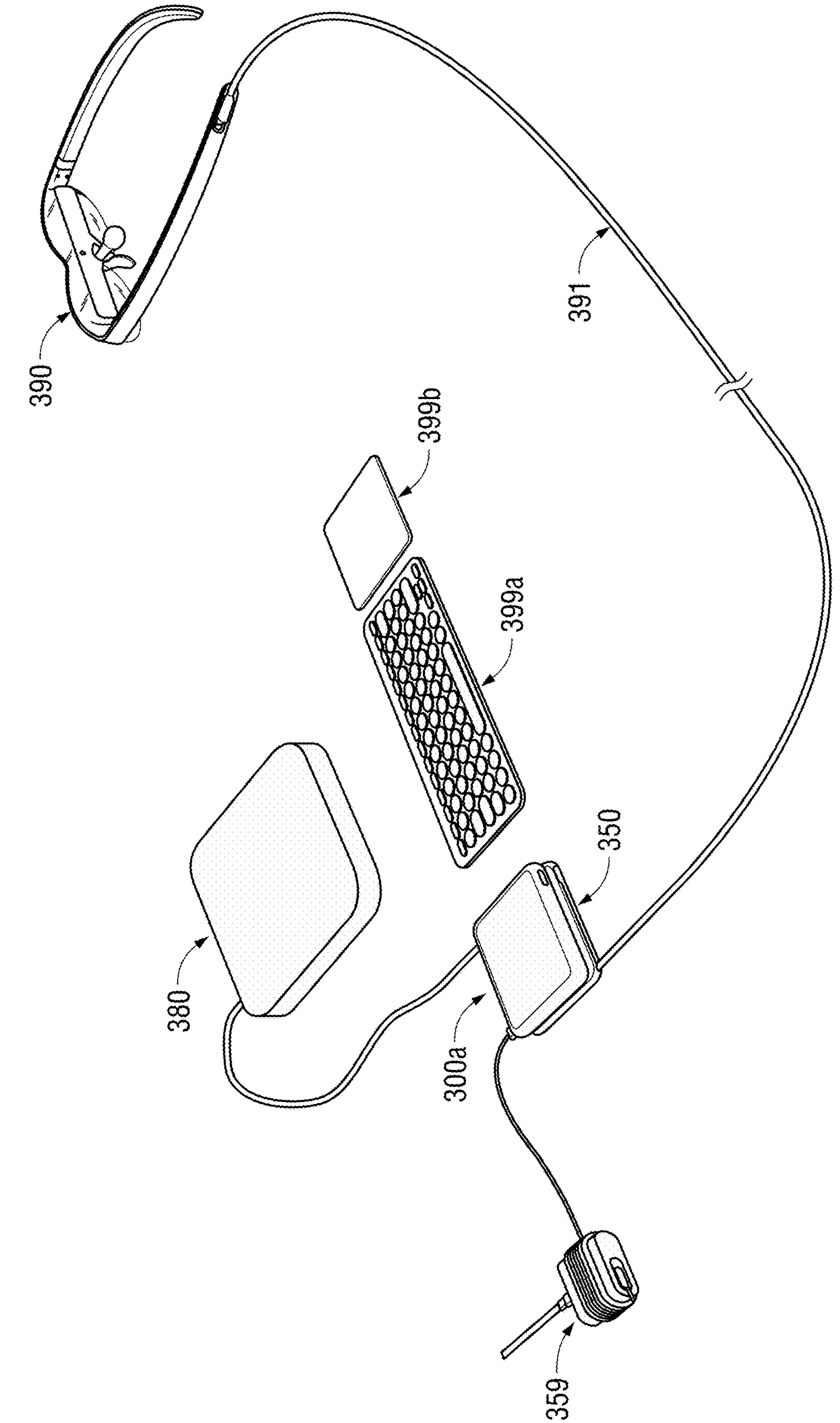
FIG. 3B is a graphical diagram illustrating an AR/MR control modular computing device docking station for facilitating control of AR/MR glasses with an operably coupled external augmented hardware processor device and an operably coupled AR/MR control modular computing device in a user workspace according to an embodiment of the present disclosure.

FIG. 3B is a graphical diagram illustrating an augmented reality/mixed reality (AR/MR) control modular computing device docking station operably connected to AR/MR glasses and to an AR/MR control modular computing device for control of the AR/MR glasses with external augmented hardware processor devices operably connected to the AR/MR control modular computing device docking station according to an embodiment of the present disclosure. As described herein, using AR/MR glasses 390 allows users to organize a virtual workspace in the space around themselves, projected on top of the real world, which may include other peripheral devices. Interactions in this physical workspace may use familiar peripherals such as a keyboard 399*a*, touchpad 399*b*, a mouse, a dial or other wired or wireless peripheral I/O devices for easy adoption and supporting existing applications executing on the AR/MR control modular computing device 300*a* and with support of the AR/MR control modular computing device docking station 350. The AR/MR control modular computing device docking station 350 in an embodiment may be wirelessly connected to one or more external input/output devices, such as wireless keyboard 399*a* and wireless touchpad 399*b*, for example, in an embodiment. This may allow the user to interact with these wireless input/output devices 399*a* and 399*b* to, for example, input keyboard strokes that may appear as text displayed within the AR/MR glasses 390 display or on a standalone digital display device (not shown). The touchpad 399*b*, for example, may allow the user to move a cursor within the AR/MR glasses 390 display as well as on any available standalone digital display that may be present in an embodiment.

The AR/MR control modular computing device docking station 350 in an embodiment may also be operatively coupled, via communication ports such as USB ports (e.g., 392 of FIG. 3A), to one or more external augmented hardware processor devices 380, which may include a graphics processing unit (GPU), neural processing unit (NPU), or accelerated processing unit (APU), for example, to augment available hardware processing resources. This may allow the AR/MR control modular computing device 300*a* in an embodiment to leverage additional processing power of these external augmented hardware processor devices 380 to maximize performance of the AR/MR glasses 390 when in use. The AR/MR control modular computing device docking station 350 in an embodiment may draw power via the AC power adapter 359, which may be plugged into a wall outlet, for example.

Figure 3C:
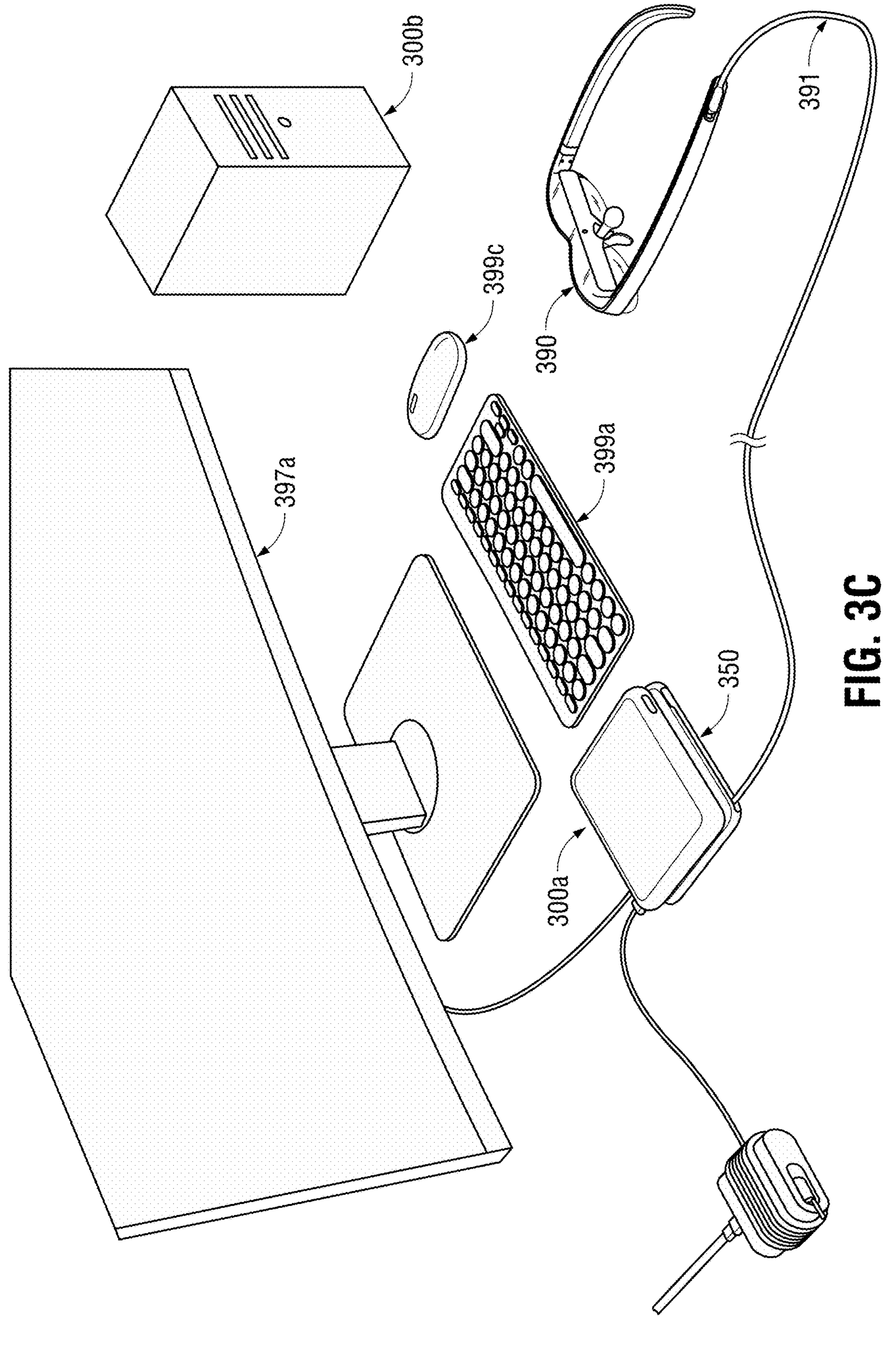
FIG. 3C is a graphical diagram illustrating an AR/MR control modular computing device docking station for facilitating control of AR/MR glasses and one or more operably coupled input/output devices including a digital display device by an operably coupled AR/MR control modular computing device in a user workspace according to an embodiment of the present disclosure.

FIG. 3C is a graphical diagram illustrating an augmented reality/mixed reality (AR/MR) control modular computing device docking station 350 operably coupled to AR/MR glasses 390, an external information handling system 300*b*, and to an AR/MR control modular computing device 300 in a desktop user workspace environment according to embodiments of the present disclosure. The AR/MR control modular computing device docking station 350 is operably coupled to the AR/MR control modular computing device 300 for control of the AR/MR glasses 390 and one or more input/output devices, including a touch drawing pad, a keyboard 399*a*, a mouse 399*c*, a digital display device 397*a* or other I/O devices within the user workspace. The AR/MR control modular computing device docking station 350 augments hardware processing resources of the AR/MR control modular computing device 300 and provides additional ports, power resources, thermal cooling, and coordination of peripheral I/O devices operably connected to the AR/MR control modular computing device docking station according to an embodiment of the present disclosure. As described herein, using AR/MR glasses 390 allows users to organize a virtual workspace in the space around themselves, projected on top of the real world, which may include other peripheral devices. Interactions in this physical user workspace use familiar peripherals such as a digital display device 399*d*, keyboard 399*a*, or a mouse 399*c*, for easy adoption and supporting existing software or firmware applications executing on the AR/MR control modular computing device 300*a* or on the external information handling system 300*b* and with support of the AR/MR control modular computing device docking station 350. The AR/MR control modular computing device docking station 350 in an embodiment may be operatively coupled, wirelessly or via communication ports such as USB ports (e.g., 392 of FIG. 3A), to one or more external input/output devices, such as digital display device 397*a*, keyboard 399*b*, or mouse 399*c*, for example, in an embodiment. This may allow the user to interact with these wired input/output devices 399*c*, 399*a*, and 397*a* to, for example, view augmented reality interactive icons surrounding the traditional display of content via the digital display 397*a*. The mouse 399*c*, for example, may allow the user to move a cursor within the AR/MR glasses 390 display, or within the digital display device 397*a* content in an embodiment. Keyboard 399*a* may provide input yielding characters displayed via the digital display device 399*d* or AR/MR glasses 390.

Figure 3D:
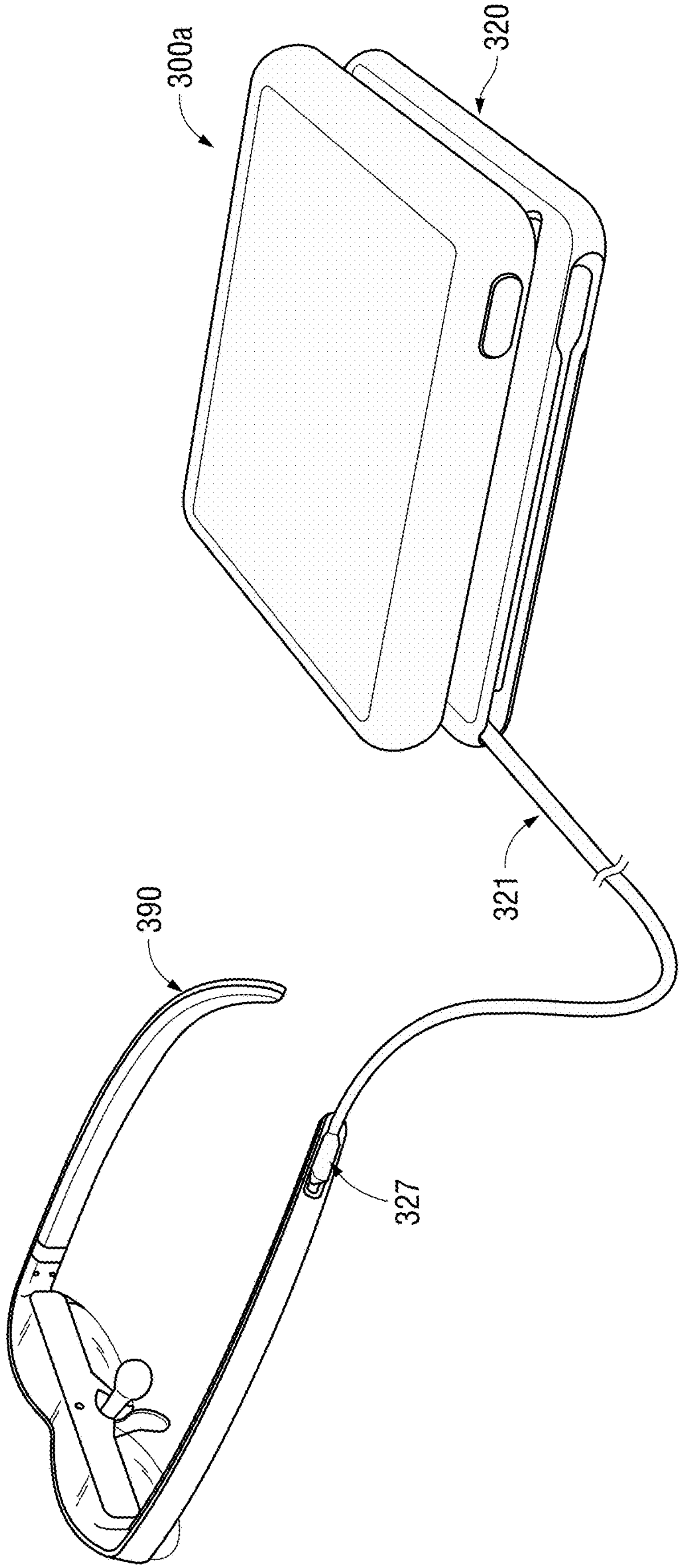
FIG. 3D is a graphical diagram illustrating an AR/MR control modular computing device operably coupled to an AR/MR glasses mobile clip device housing a retractable cable for operably coupling to AR/MR glasses during mobile use of the AR/MR glasses according to an embodiment of the present disclosure.

FIG. 3D is a graphical diagram illustrating an augmented reality/mixed reality (AR/MR) glasses mobile clip device 320 operably coupled to an AR/MR control modular computing device 300*a* and housing a retractable AR/MR power and data transfer cord 321 for operably connecting to AR/MR glasses 390 during mobile use of the AR/MR glasses 390 according to an embodiment of the present disclosure. As described herein, using AR/MR glasses 390 allows users to organize a virtual workspace in the space around themselves, projected on top of the real world. Interactions in this user workspace may further use familiar peripherals such as a keyboard, touchpad, and a mouse, for easy adoption and supporting existing applications. AR/MR glasses 390 further allow users to visualize their workspace in a format only viewable by the user themselves, allowing them to work or enjoy media such as a movie in privacy anywhere in a mobile usage mode.

Figure 4:
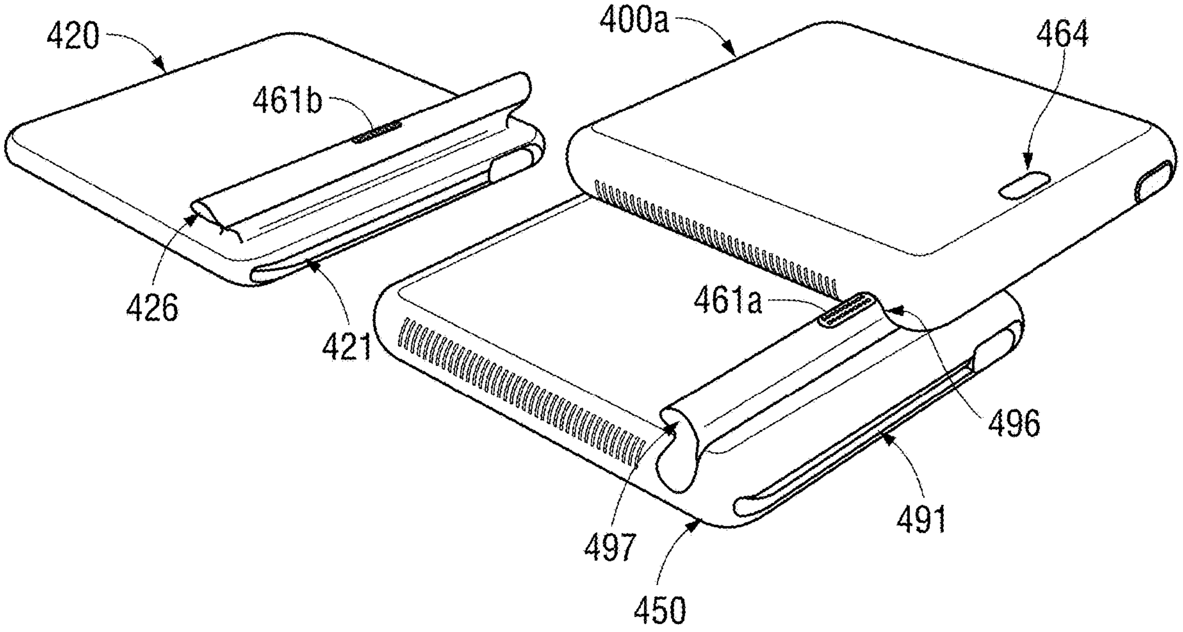
FIG. 4 is a graphical diagram illustrating an AR/MR control modular computing device forming a secure, operable coupling via a secure mating channel with a secure mating rail on either an AR/MR control modular computing device docking station or an AR/MR glasses mobile clip device according to an embodiment of the present disclosure.

Embodiments of the present disclosure allow for such portability and security by providing an ecosystem of devices that include AR/MR glasses 390, an AR/MR glasses mobile clip device 320 for mobile use of the AR/MR glasses 390, and an AR/MR control modular computing device 300*a* with secure operative coupling to the AR/MR glasses mobile clip device 320. The AR/MR control modular computing device 300*a* is a multi-function computing device for generating and orchestrating the display of digital content within the AR/MR glasses 390 and for conducting hardware and software processing with other peripheral devices regardless of whether AR/MR glasses 390 are engaged in various embodiments. Further, the AR/MR glasses mobile clip device 320 may include a retractable and magnetically securable AR/MR power and data transfer cord 391 having a universal magnetic and detachable cord connector 327 for operably coupling the AR/MR glasses 390 to the AR/MR glasses mobile clip device 320. The AR/MR glasses mobile clip device 320 also includes a secure connector pin mount as part of the secure mating rail (or secure mating channel), as shown in FIG. 4, for slidable attachment and detachment of the AR/MR glasses mobile clip device 320 to the AR/MR control modular computing device 300*a*. In some embodiments, the AR/MR glasses mobile clip device 320 and the AR/MR control modular computing device 300*a* may be of similar width or length to provide a seamless form factor for ease of use and storage as well as for aesthetic purposes.

Figure 3E:
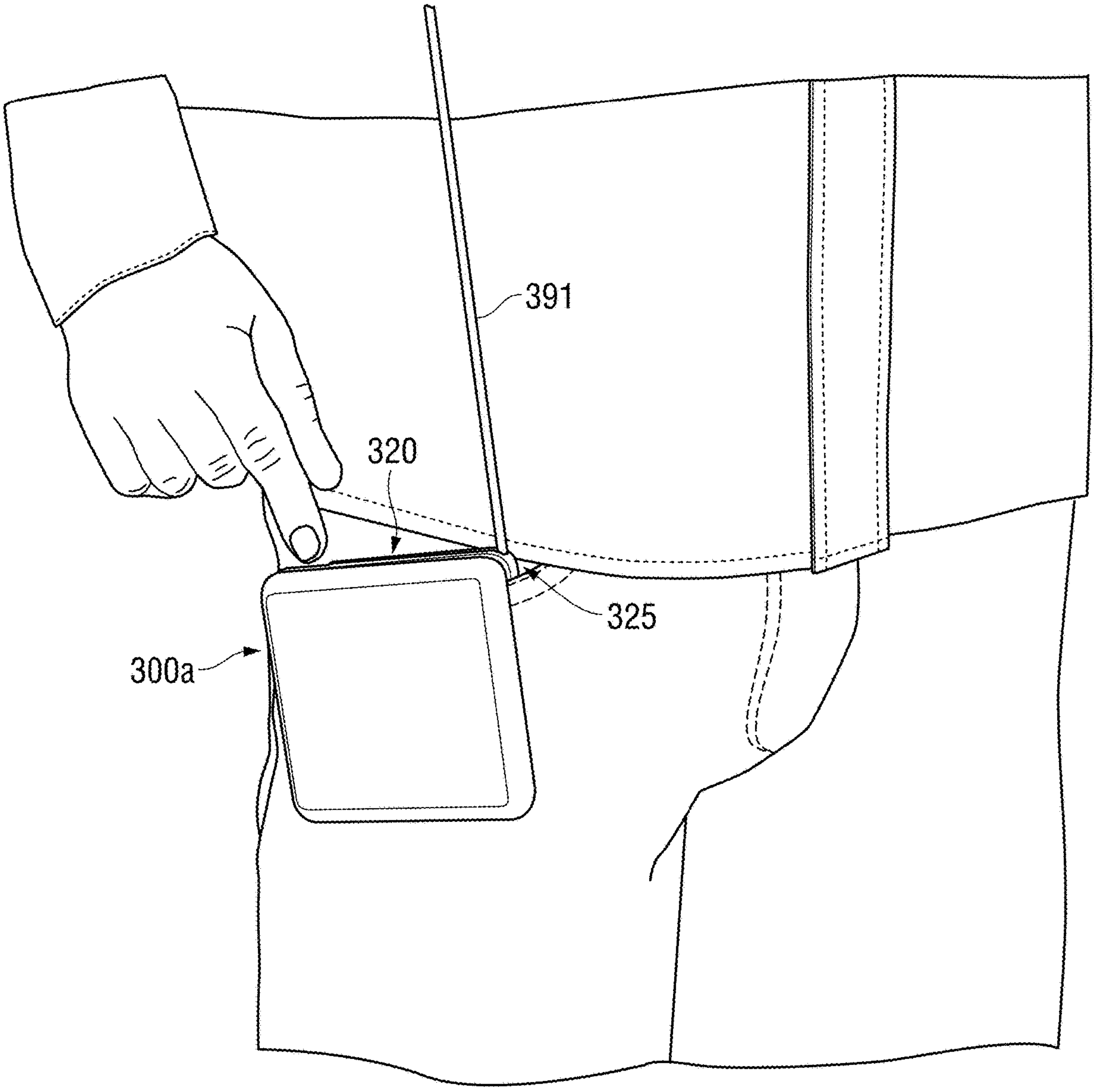
FIG. 3E is a graphical diagram illustrating an AR/MR glasses mobile clip device operably coupled to an AR/MR control modular computing device for mobile use of AR/MR glasses according to an embodiment of the present disclosure.

FIG. 3E is a graphical diagram illustrating an augmented reality/mixed reality (AR/MR) glasses mobile clip device 320 operably coupled to AR/MR glasses via an AR/MR power and data transfer cord 321 and to an AR/MR control modular computing device 300*a* for secure carrying of the AR/MR control modular computing device 300*a* during mobile use of the AR/MR glasses according to an embodiment of the present disclosure. As computing processing capabilities grow, so too does a need for more room to display content for user interaction, such as across a plurality of digital display devices, for example. Another solution to such a need is to combine digital display devices with augmented reality or mixed reality (AR/MR) glasses that can further display holographic projected images of digital content. In some embodiments, such as mobile usage of the AR/MR control modular computing device 300, digital display devices may be replaced with AR/MR glasses. This enables users to be flexible to work in different locales, such as within the office, the home, public spaces, or on the move. Users desire the same computing experience and level of privacy that they enjoy in more controlled environments, such as their home or their office, across each of these potential working locales. Use of AR/MR glasses can provide private, repeatable location independent user experiences, and relieve physical world limitation, such as screen sizes of physical screens.

Embodiments of the present disclosure allow for such portability and security by providing an ecosystem of devices that include AR/MR glasses, an AR/MR glasses mobile clip device 320 for mobile use of the AR/MR glasses with an AR/MR control modular computing device 300*a* for generating and orchestrating the display of digital content within the AR/MR glasses. In the shown embodiment, the AR/MR glasses are not shown but are understood to be coupled via a retractable and magnetically securable cord 321. Further, the AR/MR glasses mobile clip device 320 may include the retractable and magnetically securable cord 321 retractable within the housing of the AR/MR glasses mobile clip device 320 for connecting the AR/MR glasses to the AR/MR glasses mobile clip device 320. The housing of the AR/MR glasses mobile clip device 320 may be formed to have a clip structure when securely and operatively coupled to the AR/MR control modular computing device 300*a* such that the AR/MR glasses mobile clip device 320 and operatively coupled to the AR/MR control modular computing device 300*a* may be worn by a user, such as in a pocket 325 as shown. The AR/MR glasses, as described in embodiments herein, include a magnetic glasses power and data port that may be located on either or both temples of the AR/MR glasses 390 for attachment and detachment of the retractable and magnetically securable cord 321 from the AR/MR glasses mobile clip device 320 via the universal magnetic and detachable cord connector. Further, the AR/MR glasses mobile clip device 320 includes a secure mating rail on its housing with a secure connector pin mount for sliding engagement or disengagement with a secure mating channel formed into the housing of the AR/MR control modular computing device 300*a*. The AR/MR glasses mobile clip device 320 serves several functions including housing the retracting mechanism of the retractable and magnetically securable cord 321, providing connectivity ports in some embodiments, but also serving as a convenient physical clip for the AR/MR control modular computing device 300*a* such that it may be wearable or easily hung or placed in flexible locations within a physical user or desktop space environment. For example, the AR/MR glasses mobile clip device 320 operatively coupled to the AR/MR control modular computing device 300*a* in an embodiment may then be held in a user's pocket 325, for example, for secure movement of the AR/MR control modular computing device 300*a* as the user walks.

FIG. 4 is a graphical diagram illustrating an augmented reality/mixed reality (AR/MR) control modular computing device 400*a* for forming a secure physical connection and a secure data transfer connection with either an AR/MR control modular computing device docking station 450 with augmented computing capabilities or an AR/MR glasses mobile clip device 420 for mobile function, via insertion of a secure mating rail within a secure mating channel, according to an embodiment of the present disclosure. As described herein, the AR/MR control modular computing device 450 in an embodiment may include an AR/MR control modular computing device secure connector within its housing for slidable attachment and detachment of the AR/MR glasses mobile clip device 420 or the AR/MR control modular computing device docking station 450 to the AR/MR control modular computing device 400*a* via secure mating channel 496.

An AR/MR control modular computing device 400*a* in an embodiment may be disconnected from any other modular devices, clips 420, or docking stations 450 with added computing and port capabilities via an AR/MR control modular computing device secure connector port within a secure mating channel 496 of the AR/MR control modular computing device 400*a*, as shown in FIG. 4. As described herein, the AR/MR control modular computing device 400*a* in an embodiment may incorporate a secure mating channel 496 for sliding insertion of a secure mating rail 426 or 497 and electrical coupling via an AR/MR control modular computing device secure connector port within the AR/MR control modular computing device 400*a* that is extendable into the secure mating channel 496 and is actuated by a release button 464. The secure mating channel 496 is formed into one side of the housing of the AR/MR control modular computing device 400*a* along a side of the housing, such as a flat side as shown, in embodiments herein. The secure mating channel 496 of the AR/MR control modular computing device housing side is formed to indent in the housing of the secure mating channel 496 in an embodiment and sized to slidingly receive a secure mating rail 497 on a housing of an AR/MR control modular computing device docking station 450 or an AR/MR glasses mobile clip device 420. The secure mating rail 497 protrudes from the housing of the AR/MR control modular computing device docking station 450 or an AR/MR glasses mobile clip device 420 and slides horizontally into the secure mating channel 496 relative to the side of the AR/MR control modular computing device 400. The secure mating channel 496 envelopes and securely and operatively couples to the secure mating rail 497 as it slides horizontally into the secure mating channel 496 in embodiments herein. A secure connector pin mount 461*b* is incorporated within the housing of the AR/MR glasses mobile clip device 420 or a secure connector pin mount 461*b* within the housing of the AR/MR control modular computing device docking station 450, respectively, to receive the AR/MR control modular computing device secure connector port that is actuated by a release button 464 for electrical coupling or secure physical operative coupling.

In order to mate the AR/MR control modular computing device 400*a* to either an AR/MR control modular computing device docking station 450 or an AR/MR glasses mobile clip device 420, the user in an embodiment may press down on an AR/MR control modular computing device docking release button 464. This may push a flexible hinge an AR/MR control modular computing device secure connector port downward toward pivot pins of a secure connector pin mount 461*a* or 461*b* within the secure mating channel 496, to facilitate securing the secure mating rail 497 or 426 within the secure mating channel 496 after sliding the secure mating rail 497 or 426 into the secure mating channel 496. When wishing to change locations when the AR/MR control modular computing device 400*a* are currently mated to either an AR/MR control modular computing device docking station 450 or an AR/MR glasses mobile clip device 420, the user may press down on the docking release button 464 housed within the AR/MR control modular computing device 400*a* and slide the AR/MR control modular computing device 400*a* away from the currently mated AR/MR control modular computing device docking station 450 or currently mated AR/MR glasses mobile clip device 420, in various embodiments. The AR/MR control modular computing device docking release button 464 with flexible hinge may be spring tensioned such that the AR/MR control modular computing device docking release button 464 has an up position and a down position where the AR/MR control modular computing device secure connector port is engaged with a secure connector pin mount 461*a* or 461*b*. The AR/MR control modular computing device docking station 450 may have a retractable and magnetically securable cord 421 and the AR/MR glasses mobile clip device 420 may also have a retractable and magnetically securable cord 421 to operatively couple to AR/MR glasses (not shown).

Upon pressing the release button 464 to a down position during mating, the secure mating channel 496 of the AR/MR control modular computing device 400*a* in an embodiment may continue to slide with respect to secure mating rail 497 or 426, until the secure mating rail 497 or 426 with the secure connector pin mount 461*a* or 461*b*, respectively, aligns with an AR/MR control modular computing device secure connector port within the secure mating channel 496. This alignment may allow springs to push a secure connector pin port housing of the AR/MR control modular computing device secure connector port at least partially into a port receiving channel housing the secure connector pin mount 461*a* or 461*b*. Insertion or partial insertion of the secure connector pin port housing within the port receiving channel in an embodiment which may inhibit further sliding movement between the secure mating channel 496 and the secure mating rail 497 or 426. In other words, the user may insert the secure mating rail 497 or 426 into the secure mating channel 496 of the AR/MR control modular computing device 400 until the secure connector pin port housing of the AR/MR control modular computing device secure connector port in the secure mating channel 496 drops into place within the port receiving channel housing of the secure connector pin mount 461*a* or 461*b* in the secure mating rail 426 or 497. This holds the position of the AR/MR control modular computing device 400*a* with respect to either the AR/MR glasses mobile clip device 420 or the AR/MR control modular computing device docking station 450, respectively. At this point, the AR/MR control modular computing device 400*a* is electrically coupled or physically operatively coupled with the AR/MR glasses mobile clip device 420 or the AR/MR control modular computing device docking station 450. In some embodiments, pressing the release button 464 to an up position electrically and physically disengages the AR/MR control modular computing device 400*a* from the AR/MR glasses mobile clip device 420 or the AR/MR control modular computing device docking station 450 for sliding removal.

Figure 5:
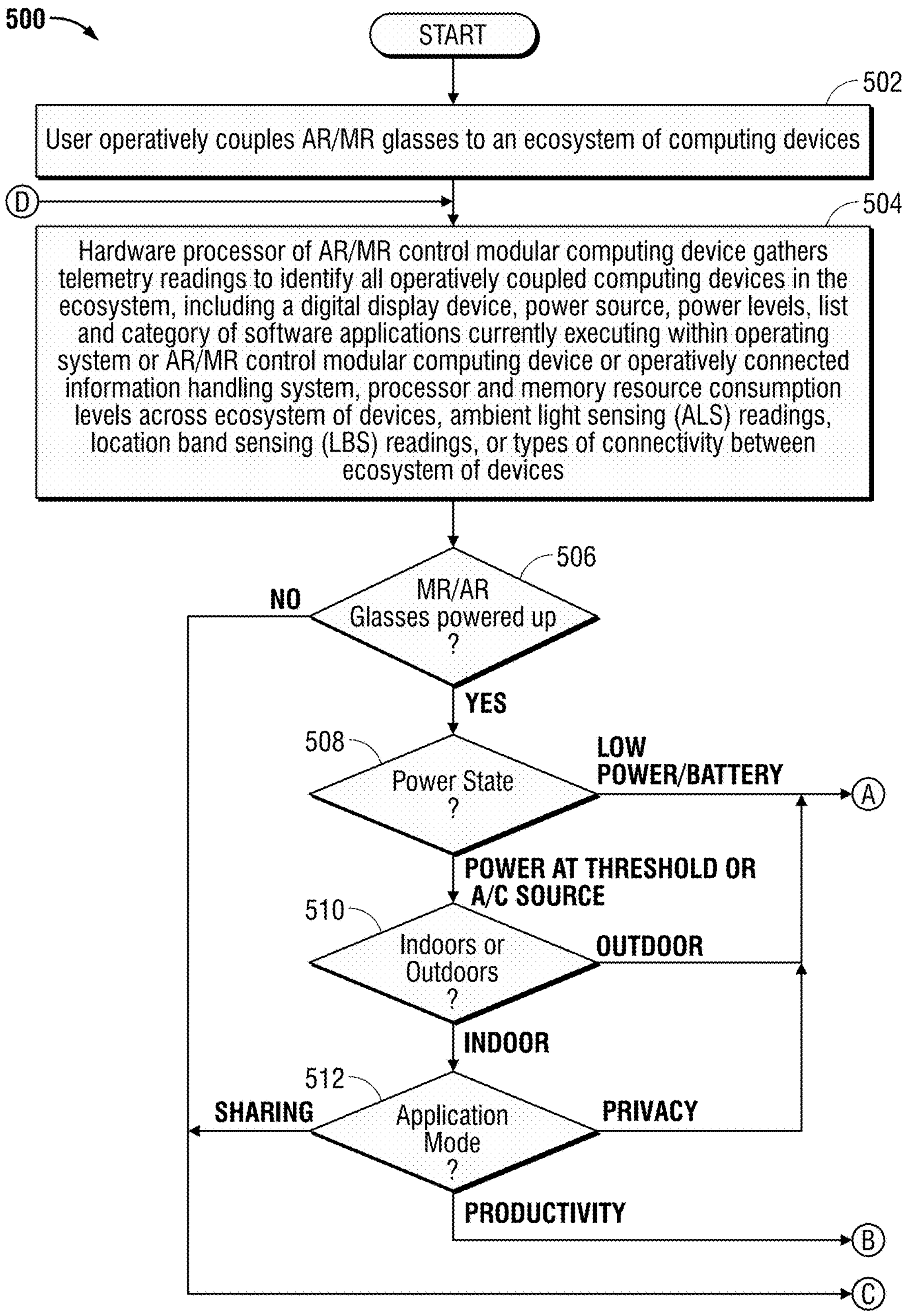
FIG. 5 is a flow diagram illustrating a method of continuously and automatically adjusting configuration of AR/MR glasses or digital display device in current use, based on current and routinely monitored device usage and power state telemetry, software application operational profiles, or detected environmental conditions or location readings according to an embodiment of the present disclosure.
Figure 5:
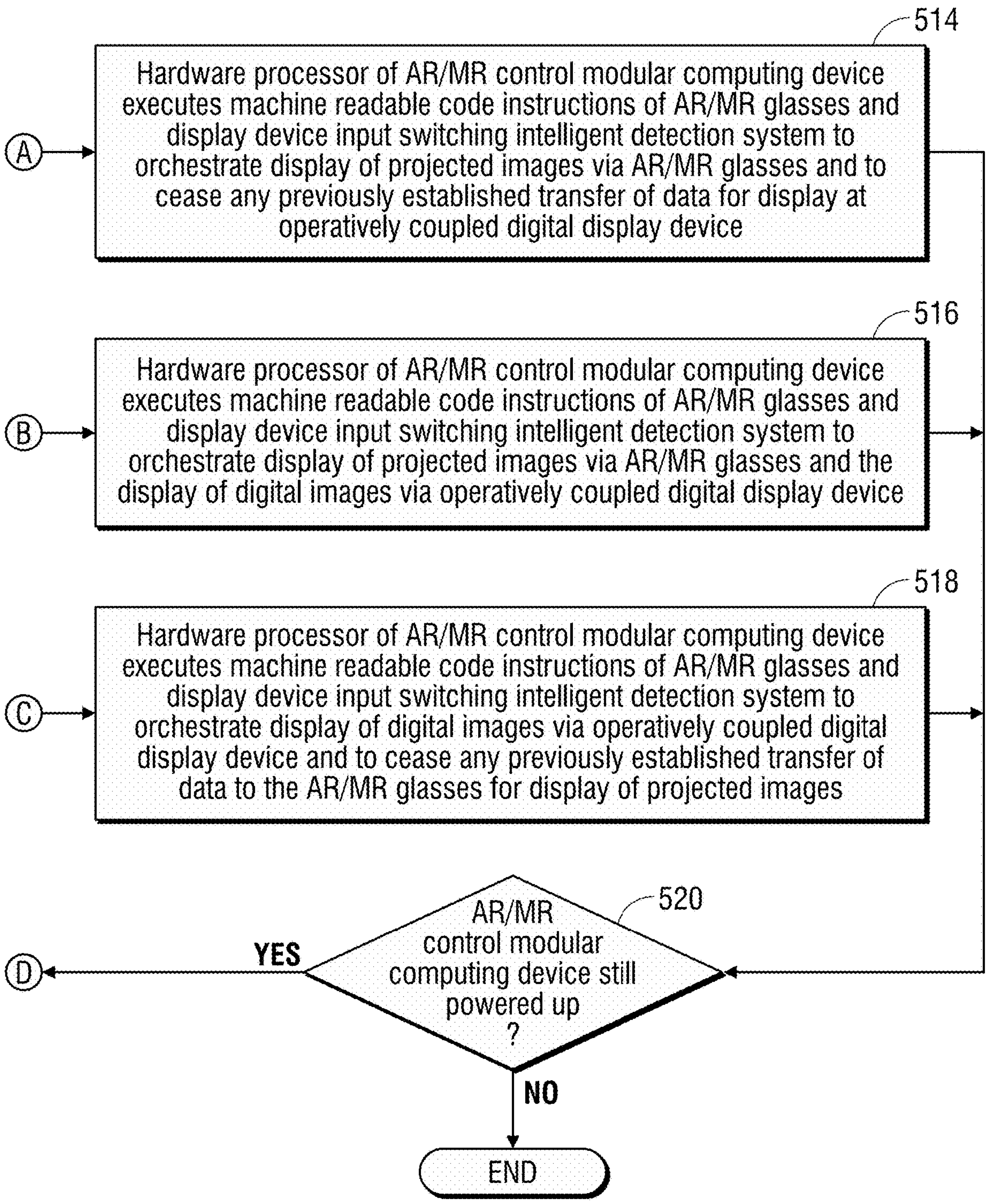

FIG. 5 is a flow diagram illustrating a method of executing machine readable code instructions of an AR/MR glasses and display device input switching intelligent detection system for continuously and automatically adjusting configuration of display devices in current use to include the AR/MR glasses alone, the digital display alone, or a combination of both, based on plural telemetry indicators for usage and power and executing software according to embodiments of the present disclosure. The hardware processor executing machine readable code instructions of an AR/MR glasses and display device input switching intelligent detection system for continuously and automatically adjusting configuration of display devices automatically detects current and routinely monitored usage and power state telemetry, software application operational profiles, and environment and location readings as plural telemetry indicators according to an embodiment of the present disclosure. The execution of machine readable code instructions of an AR/MR glasses and display device input switching intelligent detection system for continuously and automatically adjusting configuration of display devices facilitates selection among plural digital display device combinations, such as with AR/MR glasses or digital display devices in a user's workspace environment. The AR/MR glasses and display device input switching intelligent detection system of embodiments executing on a hardware processor of the AR/MR control modular computing device of the present disclosure address these issues by continuously and automatically adjusting the set configuration of display devices in current use and orchestrates the generation of image display data for projected or displayed images via one or more configurations of the AR/VR glasses alone, the external digital display device alone, or some combination in embodiments herein. The determination of a recommended display configuration may be made in an embodiment described with respect to the current figure based on usage telemetry data, power state telemetry data, software application operational profiles, and environment and location readings that indicate the ways in which the user is currently interacting with the ecosystem of devices operatively connected to the AR/MR control modular computing device.

At block 502, a user may operatively couple AR/MR glasses to an ecosystem of computing devices that may include the AR/MR control modular computing device. For example, in an embodiment described with respect to FIGS. 3A, 3B, 3C, 3D, and 3E, an ecosystem of devices are described herein, which include AR/MR glasses 390, an AR/MR glasses mobile clip device 320 for mobile use of the AR/MR glasses 390, an AR/MR control modular computing device docking station 350 for desktop operation, an AR/MR control modular computing device 300*a*, a digital display device 397*a*, and an optional external information handling system 300*b*. The AR/MR control modular computing device 300*a* is multifunctional in that it operates to generate and orchestrate the display of digital content within the AR/MR glasses 390 as well as for operating other computing functions for a user with I/O devices in a physical user workspace such as a standalone digital display device 397*a*, keyboard 399*a*, mouse 399*b*, dial or other I/O peripheral device for execution of machine readable code instructions of software or firmware in embodiments herein. The AR/MR control modular computing device 300*a* may operatively couple with either the AR/MR glasses mobile clip device 320 for mobile use, or with an AR/MR control modular computing device docking station 350 for stationary or desktop use via an AR/MR control modular computing device secure connection port between a reciprocal secure mating channel on one side and a secure mating rail on the other side.

A hardware processor of an AR/MR control modular computing device in an embodiment at block 504 may gather usage telemetry readings to identify all operatively coupled computing devices in a user workspace ecosystem that are connected and available and active hardware and software resources, wired or wireless connections of the same, security measures employed, as well as power state telemetry, including power sources and power levels. Further, the hardware processor of an AR/MR control modular computing device in an embodiment at may gather telemetry on operating software applications or firmware for generating image data and compare to a software application operational profile determined based on the list and category of software applications currently executing within an operating system of the AR/MR control modular computing device or any operatively coupled docking station or information handling system as well as current telemetry indicators during such software or firmware execution in generating image display data. Additionally, the hardware processor of an AR/MR control modular computing device in an embodiment at may gather environment or location telemetry such as from ambient light sensing (ALS) readings or location band sensing (LBS) readings to determine location or mobility of the AR/MR control modular computing device and the AR/MR glasses during operation.

For example, in an embodiment described with respect to FIG. 1, the hardware processor 102*a* of the AR/MR control modular computing device 100*a* in an embodiment may execute machine readable code instructions of the telemetry collection module 161 within the AR/MR glasses and display device input switching intelligent detection system 160 to gather telemetry readings to identify all operatively coupled computing devices in the ecosystem (e.g., 100*b*, 120, 150, 199) including the AR/MR glasses 190 and any digital display device 197*a*. The telemetry reading may include active state of wired or wireless connections among those operatively coupled computing devices in the ecosystem as well as hardware processing resources, memory resources available for executing software or firmware for generating image display data in various embodiments. Such telemetry readings may further include power state telemetry, including power sources and power levels available to the AR/MR control modular computing device 100*a* and AR/MR glasses 190, and executing software or firmware application telemetry for comparison to software application operational profiles determined from a list of software applications (e.g., 111) or firmware currently executing within an operating system 113*a* of the AR/MR control modular computing device 100*a* or within the external information handling system operating system 113*b* of the operatively connected information handling system 100*b* for generating image display data. Environment and location telemetry data may be gathered from ambient light sensing (ALS) readings via an ambient light sensor 162 for indoor/outdoor environment light indicators, and location band sensing (LBS) readings from the AR/MR modular control computing device wireless interface adapter 130 as it connects wirelessly to a plurality of networks (e.g., 140) to indicate location or mobility of the AR/MR control modular computing device 100*a* or the AR/MR glasses.

At block 506, the hardware processor of the AR/MR control modular computing device in an embodiment may execute machine readable code instructions of the AR/MR glasses and display device input switching intelligent detection system to determine whether the MR/AR glasses are powered on. This may be the first step in determining whether to output images for display to the AR/MR glasses alone, a digital display such as a computing monitor alone, or a combination of the AR/MR glasses and the digital display. If the AR/MR glasses have not been powered on, there may be no need to display images via projection with the AR/MR glasses, and the method may proceed to block 518 for the display of images solely via the digital display. This may reduce the hardware processing required and adjust the execution of the software or firmware applications generating the image display data for only 2D images for display on the digital display device in example embodiments herein. However, the digital display device may require power levels, such as if in a laptop or tablet information handling system, that meet a certain power level as described below. If the AR/MR glasses have been powered on, the method may proceed to block 508 to determine a recommended configuration for the display of images generated from software or firmware applications via one or more of these devices, based various telemetry indicators and operating software or firmware classification such as usage telemetry, current power availabilities, location of the ecosystem of devices, and current usage patterns of the software or firmware applications for the ecosystem of devices.

The hardware processor of the AR/MR control modular computing device in an embodiment at block 508 may execute machine readable code instructions of the AR/MR glasses and display device input switching intelligent detection system to determine a current power state available for use by the AR/MR control modular computing device and, by extension, the AR/MR glasses. As described herein, the AR/MR control modular computing device may receive power via an internal battery, direct connection to a power outlet via an internal USB-C port and alternating current/direct current (AC/DC) power adapter, or indirectly from an operatively coupled AR/MR control modular computing device docking station, an AR/MR glasses mobile clip device, or separate information handling system, such as a laptop, tablet, or desktop computer. Each of these sources may be considered when determining available power for the AR/MR control modular computing device in embodiments herein. If the power available to the AR/MR control modular computing device is provided solely from a battery source having available power below a threshold low power value, the method may proceed to block 514 for display of images solely via the AR/MR glasses that may be the primary and default output device for the AR/MR control modular computing device, in order to conserve power that would otherwise be drawn by the digital display device or for processing display image data in formats for both the AR/MR glasses and digital display device. Moreover, the AR/MR control modular computing device is provided solely from a battery source having available power below a threshold low power value is another telemetry indicator of mobile usage of the AR/MR control modular computing device and AR/MR glasses such that display on a digital display device is not required. Such a threshold low power value in an embodiment may be, for example, 50%, 75%, or 80%, although it is contemplated that any power level value above may comprise the threshold low power value, and may be adjustable by a manufacturer or the AR/MR glasses, or a user. If the power available to the AR/MR control modular computing device is provided either directly or indirectly via an AC/DC power adapter plugged into a power outlet, or by a battery having remaining power above the threshold low power value, the method may proceed to block 510 to determine whether to also output image display data in formats for display at the digital display device or the AR/MR glasses, based on the detected environment or location telemetry of the AR/MR control modular computing device and AR/MR glasses in the ecosystem of devices, as well as current usage patterns and executing software or firmware applications for the AR/MR control modular computing device within the ecosystem of devices.

At block 510, the hardware processor of the AR/MR control modular computing device in an embodiment may execute machine readable code instructions of the AR/MR glasses and display device input switching intelligent detection system to determine whether the AR/MR glasses and AR/MR control modular computing device are currently operating indoors or outdoors. This may be determined through ambient light sensing to identify brighter light indicating outdoor usage, or through local band sensing from wireless connectivity to a wireless network where applicable indicating that the AR/MR control modular computing device is at an indoor or outdoor location or is on the move and currently in mobile use. In other words, determination that the AR/MR control modular computing device is outdoors may be an indicator of mobile use in which use of a digital display device may be inappropriate or unworkable. In this case of mobile usage, the AR/MR control modular computing device may not need hardware processing resources dedicated to generating image display data for formats on digital display devices adjusting selection and operation of those hardware processing resources and memory used. If the AR/MR control modular computing device is determined to be outdoors, the method may proceed to block 514 for display of projected images solely via the AR/MR glasses. If the AR/MR control modular computing device is determined to be indoors, the method may proceed to block 512 to determine whether to also output image display data for display at the digital display device, AR/MR glasses, or some combination based on current usage patterns from usage telemetry indicators and current software or firmware execution by the AR/MR control modular computing device within the ecosystem of devices.

The hardware processor of the AR/MR control modular computing device in an embodiment at block 512 may execute machine readable code instructions of the AR/MR glasses and display device input switching intelligent detection system to determine a software application operational profile describing the current usage pattern including executing software applications, their classification, and one or more usage telemetry indicators to generate a recommendation and automatically switch to a recommended display configuration based on this software application operational profile. Examples of software application operational profiles in an embodiment may include privacy mode, productivity mode, and sharing or collaboration mode. These are only a few examples, and it is contemplated that any usage pattern that tends toward usage of the AR/MR glasses alone, the digital display alone, or a combination of the two may be used to determine a recommendation and automatically switch to a display configuration in various embodiments herein. In some embodiments, a user may be presented with a graphical interface, a tone, or a haptic indication of the configuration being automatically switched to and may override or choose a different configuration amongst AR/MR glasses alone, the digital display device alone, or a combination.

A privacy mode may be indicated as a classification for an executing software application when the user is viewing sensitive information, has firewalls in place, is transceiving data via a secure virtual private network (VPN), or is located in a secured location such as a secure work campus, as example reported telemetry indicators. Each of these privacy mode telemetry indications may be listed, for example, in a privacy mode profile stored in memory at the AR/MR control modular computing device in an embodiment and associated with particular types of software applications executing. The hardware processor of the AR/MR control modular computing device may execute machine readable code instructions of the AR/MR glasses and display device input switching intelligent detection system in an embodiment to compare the list and category of software applications currently executing within the operating system of the AR/MR control modular computing device or of an operably connected information handling system to these privacy mode telemetry indicators within the privacy mode profile, and determine that the AR/MR control modular computing device is currently operating in the privacy mode if a threshold number of privacy mode telemetry indicators within the privacy mode profile for the executing software application are met, for example. In such a scenario, it may be favorable for the user to view such sensitive information in generated image display data from that executing software application in an environment in which other people nearby cannot look over the user's shoulder to view such content, as may be possible when using a digital display device such as a computer monitor. Thus, upon determination that the AR/MR control modular computing device is currently executing a particular software application and is operating in a designated privacy mode, the method may proceed to block 514 for the AR/MR control modular computing device to only engage hardware processing resources to generate image display data in formats for the display of projected images via the AR/MR glasses alone, to inhibit viewing of the sensitive data via a digital display device by outside viewers.

A productivity mode may be indicated as a classification for an executing software application when usage telemetry indicators indicate that the user is currently executing software applications routinely used in the course of business, for example. A productivity mode profile stored in memory at the AR/MR control modular computing device in an embodiment may include a list of such software applications, such as Microsoft® Outlook®, Power Point® Word®, computer programming applications, production testing applications, database business management platforms, or customer relation management platforms that may classify as productivity mode software applications. Usage telemetry indicators may indicate a desktop stationary location and wired or wireless connectivity to a plurality of I/O devices within a user's desktop workspace. The hardware processor of the AR/MR control modular computing device may execute machine readable code instructions of the AR/MR glasses and display device input switching intelligent detection system in an embodiment to compare the list and category of software applications currently executing within the operating system of the AR/MR control modular computing device or of an operably connected information handling system to these productivity mode software applications within the productivity mode profile, and determine that the AR/MR control modular computing device is currently operating in the productivity mode if a threshold number of productivity mode telemetry indicators within the productivity mode profile are met, for example. In such a scenario, it may be favorable for the user to leverage as many devices, including I/O devices, as possible to view and interact with the large amount of data accessed during such work, in order to increase user productivity. This may present a favorable user workspace environment for the use of both the AR/MR glasses and the digital display device for display of generated display image data. Thus, upon determination that the AR/MR control modular computing device is currently operating in a designated productivity mode, the method may proceed to block 516 for the AR/MR control modular computing device to engage hardware processing resources to generate image display data in formats for display of projected images via the AR/MR glasses and the display of digital images via the digital display device to maximize display space.

A sharing or collaboration mode may be indicated as a classification for an executing software application when usage telemetry indicators indicate that the user is engaged in a conversation or collaboration with other individuals, via the information handling system or AR/MR control modular computing device, the user may limit use of the AR/MR glasses so that the user may clearly see and make eye contact with these other individuals in the collaboration, for example. This may be the case if the user is currently executing software applications for remote meeting participation, such as Microsoft® Teams®, or Zoom®, or presentation software, for example. Further, sharing or collaboration telemetry indicators indicating engagement with I/O devices such as use of a microphone, web camera, a pointer, or other communication tools may be detected as usage telemetry. Each of such remote meeting participation, communication, or presentation software applications in an embodiment may be listed within a sharing mode profile stored at the AR/MR control modular computing device in an embodiment. The hardware processor of the AR/MR control modular computing device may execute machine readable code instructions of the AR/MR glasses and display device input switching intelligent detection system in an embodiment to compare the list of software applications currently executing within the operating system of the AR/MR control modular computing device or of an operably connected information handling system to these sharing mode software applications within the sharing mode profile, and determine that the AR/MR control modular computing device is currently operating in the sharing mode if a threshold number of sharing mode telemetry indicators within the sharing mode profile are met, for example. In such a scenario, it may be favorable for the user to take off the AR/MR glasses, which may inhibit clear sight of all participants and the ability for the user to make eye contact with outside or remote participants and communicate via one or more presentation or communication I/O devices. Thus, upon determination that the AR/MR control modular computing device is currently operating in a designated sharing mode, the method may proceed to block 518 for the AR/MR control modular computing device to only engage hardware processing resources to generate image display data in formats for the display of projected images via the display device alone, due to the likelihood that the user will remove the AR/MR glasses during execution of such remote meeting participation software applications.

At block 514, in an embodiment in which low battery power is available, the AR/MR control module computing device is located outdoors, or in which the AR/MR control module computing device or operatively couple information handling system is operating in privacy mode, the hardware processor of the AR/MR control modular computing device may execute machine readable code instructions of the AR/MR glasses and display device input switching intelligent detection system to orchestrate generation of image display data and location data using hardware processing resources and memory as well as software and firmware drivers limited to display of projected images via the AR/MR glasses, and to cease any previously established transfer of image display data for display at an operatively coupled digital display device. For example, the hardware processor 102*a* of the AR/MR control modular computing device 100*a* may execute machine readable code instructions 114 of the AR/MR glasses and display device input switching intelligent detection system 160 to orchestrate hardware resources, sensors, and software or firmware to generate image display data limited to display of projected images via the AR/MR glasses 190, and to cease any previously established transfer of image display data generated for display of 2D images at an operatively coupled digital display device 197*a*. The hardware processor 102*a* of the AR/MR control modular computing device 100*a* may then execute machine readable code instructions 114 of the AR/MR glasses firmware 119 to orchestrate the display of projected images generated at GPU 106 via the display projector circuitry 116 of the AR/MR glasses 190. The hardware processor 102*a* of the AR/MR control modular computing device 100*a* may also execute machine readable code instructions 114 of the digital display device firmware 197*b* or instruct the external information handling system 100*b* to execute machine readable code instructions of the digital display device firmware 197*b* to cease hardware resource operation for generating image display data for the display of digital images by a digital display device as generated at GPU 106 or the external information handling system hardware processor 102*b*, for example. The method may then proceed to block 520 for determination as to whether the AR/MR control modular computing device is still powered on.

In an embodiment at block 516 in which power above a threshold low power value or AC power is available for use at the AR/MR control modular computing device that is located indoors and is operating in a productivity mode, or is operatively coupled to an information handling system operating in productivity mode, the hardware processor of the AR/MR control modular computing device may execute machine readable code instructions of the AR/MR glasses and display device input switching intelligent detection system to orchestrate generation of image display data using engagement of hardware processing resources and memory as well as software and firmware drivers for display of projected images via the AR/MR glasses simultaneously with the display of digital images via the operatively coupled digital display device. For example, the hardware processor 102*a* of the AR/MR control modular computing device 100*a* may execute machine readable code instructions 114 of the AR/MR glasses and display device input switching intelligent detection system 160 to orchestrate hardware resources, sensors, and software or firmware to generate image display data and location data for display of projected images via the AR/MR glasses 190 simultaneously with hardware resources, sensors, and software or firmware to generate image display data for the display of digital images via the operatively coupled digital display device 197*a*. The hardware processor 102*a* of the AR/MR control modular computing device 100*a* may then execute machine readable code instructions 114 of the digital display device firmware 197*b* or instruct the external information handling system 100*b* to execute machine readable code instructions of the digital display device firmware 197*b* to display digital images generated at GPU 106 or the external information handling system hardware processor 102*b*, for example. The method may then proceed to block 520 for determination as to whether the AR/MR control modular computing device is still powered on.

At block 518, in an embodiment in which power above a threshold low power value is available for use at the AR/MR control modular computing device that is located indoors and is operating in a sharing mode, or is operatively coupled to an information handling system operating in sharing mode, the hardware processor of the AR/MR control modular computing device may execute machine readable code instructions of the AR/MR glasses and display device input switching intelligent detection system to orchestrate generation of image display data using hardware processing resources and memory as well as software and firmware drivers limited to display of digital images via the operatively coupled digital display device alone, and to cease any previously established transfer of data to the AR/MR glasses for display of projected images. For example, the hardware processor 102*a* of the AR/MR control modular computing device 100*a* may execute machine readable code instructions 114 of the AR/MR glasses and display device input switching intelligent detection system 160 to orchestrate hardware resources, sensors, and software or firmware to generate image display data limited to display of digital images via the operatively coupled digital display device 197*a* alone, and to cease any previously established transfer of image data to the AR/MR glasses 190 for display of projected images. The hardware processor 102*a* of the AR/MR control modular computing device 100*a* may then execute machine readable code instructions 114 of the digital display device firmware 197*b* or instruct the external information handling system 100*b* to execute machine readable code instructions of the digital display device firmware 197*b* to display of digital images generated at GPU 106 or the external information handling system hardware processor 102*b*, for example. The hardware processor 102*a* of the AR/MR control modular computing device 100*a* may also execute machine readable code instructions 114 of the AR/MR glasses firmware 119 to cease the display of projected images generated at GPU 106 via the display projector 116 of the AR/MR glasses 190.

The automatic switching to a determined display configuration by execution of the AR/MR glasses and display device input switching intelligent detection system may be overridden by a user at any time. In embodiments herein, upon selection of a recommended display configuration at blocks 514, 516, or 518 and before automatic switching to that selected display configuration and adjustments to the AR/MR control modular computing device generating the digital image data for display, the machine readable code instructions of the AR/MR glasses and display device input switching intelligent detection system may notify the user of the automatic switching via a graphical user interface, a tone, a haptic feedback or other system. The user may elect to reject the recommended display configuration. For example, the AR/MR control modular computing device executing machine readable code instructions of the AR/MR glasses and display device input switching intelligent detection system may detect or determine whether the user has manually changed the configuration, or overridden the recommended display configuration intended for switching. This may be done at prompting via a graphical user interface, audio tone, haptics or other indicator by the machine readable code instructions of the AR/MR glasses and display device input switching intelligent detection system of the automatic switching to a recommended configuration. A user may elect to reject the automatic switching or may manually change the display configuration in embodiments herein. The hardware processor executing the machine readable code instructions of the AR/MR glasses and display device input switching intelligent detection system may detect and record this rejection or manual change and either keep the current display configuration or accommodate the manual change in embodiments herein.

It may be determined at block 520 in an embodiment whether the AR/MR control modular computing device is still powered on. If the AR/MR control modular computing device is still powered on, the method may proceed back to block 504 to gather new telemetry data for automatically determining whether a need for change in display configuration has arisen. By repeating the loop between blocks 504 and 520, the hardware processor of the AR/MR control modular computing device executing machine readable code instructions of the AR/MR glasses and display device input switching intelligent detection system may continuously and automatically adjust the configuration of display devices in current use to include the AR/MR glasses alone, the digital display alone, or a combination of both, based on current and routinely monitored power state telemetry, software application operational profiles, ALS readings, and LBS readings. If the AR/MR control modular computing device has powered down, the method for continuously and automatically adjusting configuration of display devices amongst the AR/MR glasses alone, the digital display alone, or a combination of both, based on current and routinely monitored telemetry and software application operational profiles may then end.

Figure 6:
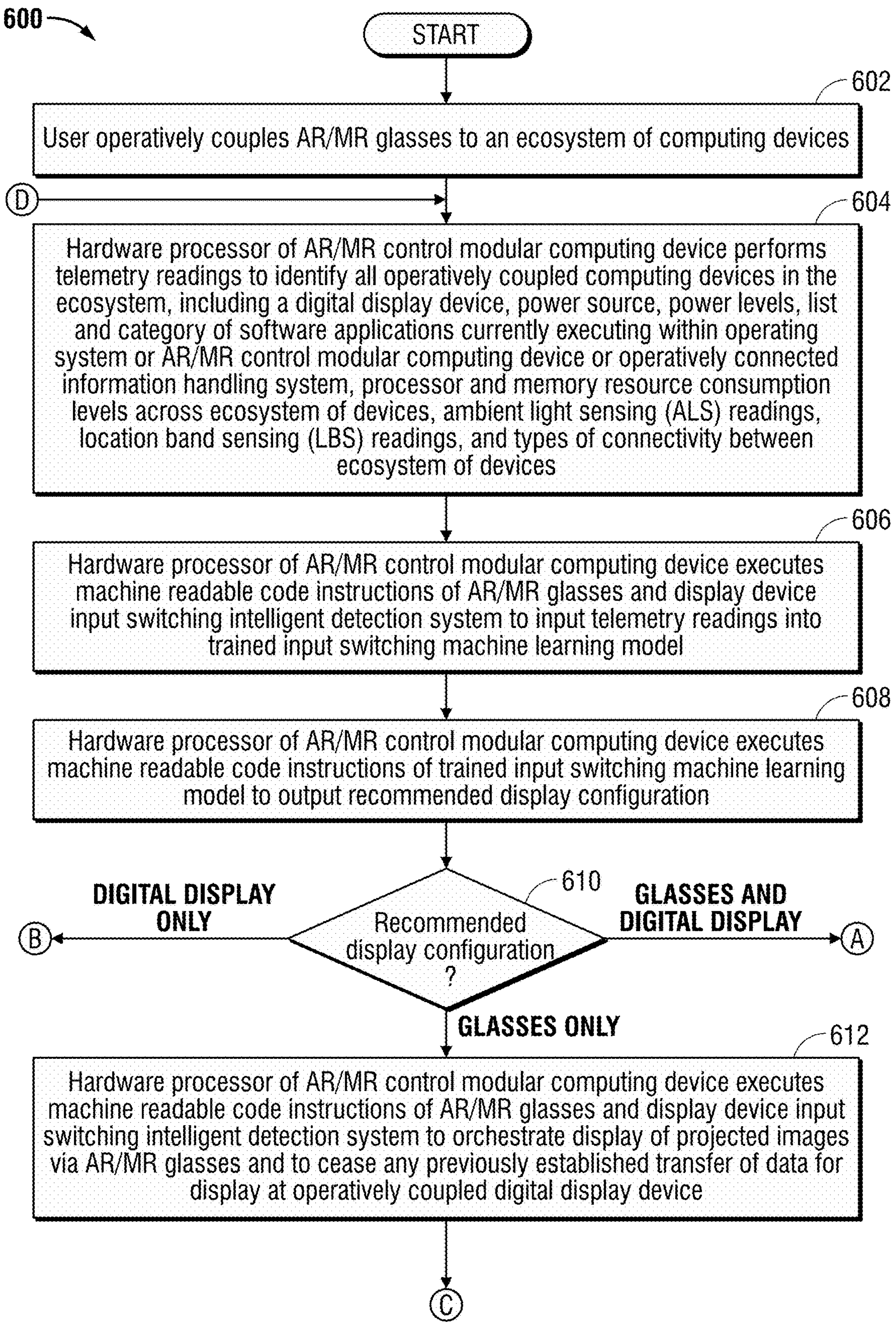
FIG. 6 is a flow diagram illustrating a method of continuously and automatically adjusting configuration of AR/MR glasses or digital display device in current use, based on recommendations output by a trained input switching machine learning model based on inputs for device usage and power state telemetry, software application operational profiles, or detected environmental conditions or location readings according to an embodiment of the present disclosure.
Figure 6:
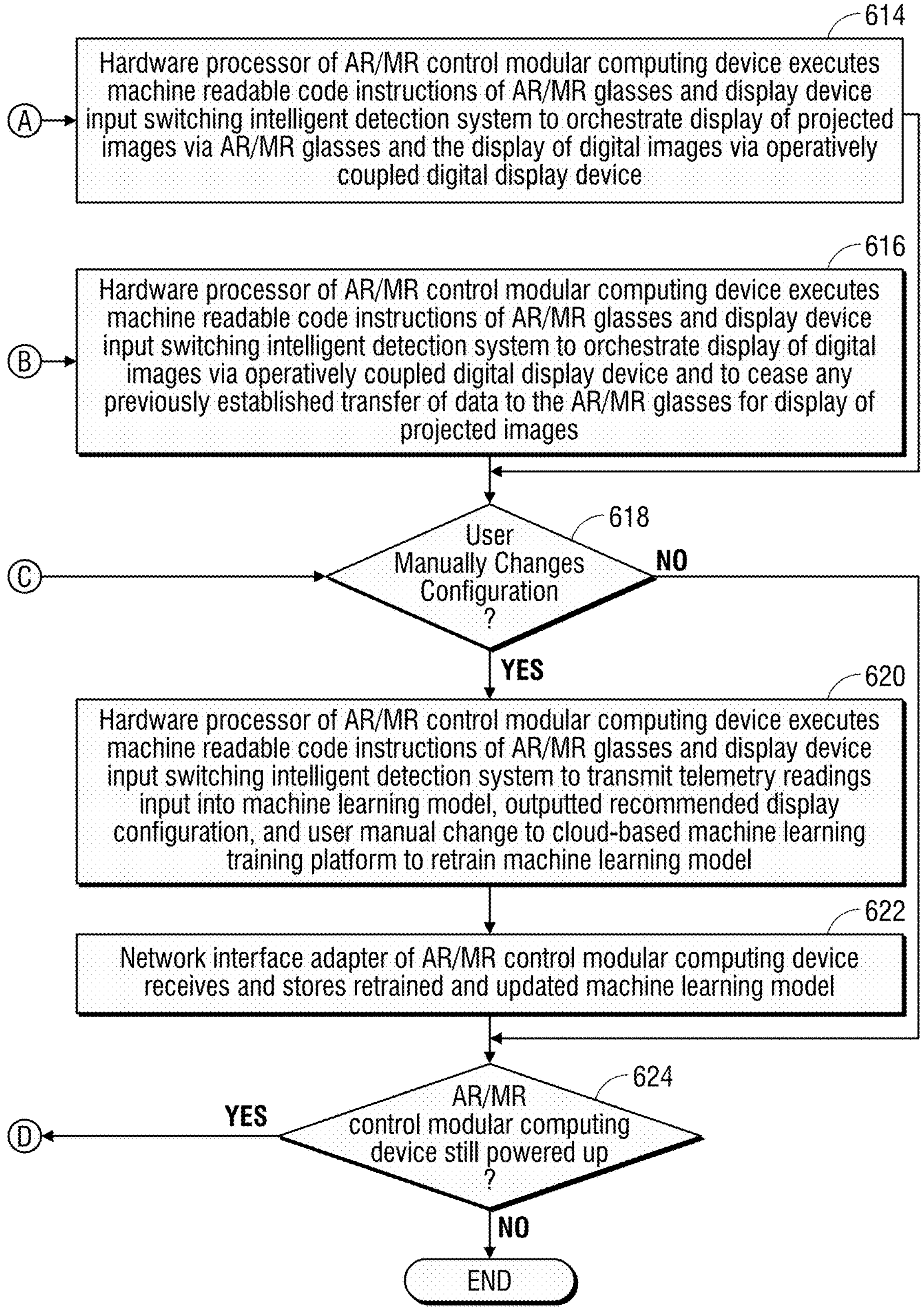

FIG. 6 is a flow diagram illustrating a method of continuously and automatically adjusting configuration of display devices in current use to include the AR/MR glasses alone, the digital display alone, or a combination of both, based on recommendations output by a trained input switching machine learning model with telemetry data inputs and indication of operating software applications generating image display data according to an embodiment of the present disclosure. As described herein, a hardware processor executing machine readable code instruction of an AR/MR glasses and display device input switching intelligent detection system of embodiments of the present disclosure may automatically streamline switching of the AR/MR control modular computing device use of hardware resources, software and firmware processing, and sensor engagement for continuously and automatically adjusting the set configuration of display devices in current use to include AR/MR glasses alone, an external digital display alone, or a combination of both, based on current and routinely monitored operational usage telemetry and detection of executing software applications or firmware. The AR/MR control modular computing device executes machine readable code instructions of an input switching learning model as part of the AR/MR glasses and display device input switching intelligent detection system in some embodiments to orchestrate generation of image display data using hardware processing resources and memory as well as software and firmware drivers for the display of projected images via the AR/VR glasses and potentially, the display of digital images via the external digital display device. The determination of a recommended display configuration may be made in an embodiment described with respect to the current figure based on recommendations output by this trained input switching machine learning model that has been trained on crowd-sourced operational telemetry and user-selected display configurations across a plurality of AR/MR control modular computing devices.

At block 602, the user in an embodiment may operatively couple the AR/MR glasses to an ecosystem of computing devices, such as an AR/MR control modular computing device. For example, in an embodiment described with respect to FIGS. 3A, 3B, 3C, 3D, and 3E, an ecosystem of devices are described herein, which include AR/MR glasses 390, an AR/MR glasses mobile clip device 320 for mobile use of the AR/MR glasses 390, an AR/MR control modular computing device docking station 350 for desktop use, an AR/MR control modular computing device 300*a*, a digital display device 397*a*, and an optional external information handling system 300*b*. The AR/MR control modular computing device 300*a* is multifunctional in that it operates to generate and orchestrate the display of digital content within the AR/MR glasses 390 as well as for operating other computing functions for a user with I/O devices in a physical desktop space such as a standalone digital display device 397*a*, keyboard 399*a*, mouse 399*b*, dial or other I/O peripheral device for execution of machine readable code instructions of software or firmware in embodiments herein. The AR/MR control modular computing device 300*a* may operatively couple with either the AR/MR glasses mobile clip device 320 for mobile use, or with an AR/MR control modular computing device docking station 350 for stationary or desktop use via an AR/MR control modular computing device secure connection port between a reciprocal secure mating channel on one side and a secure mating rail on the other side.

A hardware processor of an AR/MR control modular computing device in an embodiment at block 604 may gather processor and memory resource consumption level readings across the ecosystem of devices, as well as connectivity profiles identifying all input/output (IO) devices, including any digital display device, operatively coupled to the AR/MR control modular computing device and the types of such connections (e.g., wired or wireless). This may further include gathering of usage telemetry readings described above in FIG. 5 at block 504 to identify all operatively coupled computing devices in the user workspace ecosystem that are connected and available and active hardware and software resources, wired or wireless connections of the same, security measures employed, as well as power state telemetry, including power sources and power levels. Further, the hardware processor of an AR/MR control modular computing device in an embodiment at may gather telemetry on operating software applications or firmware for generating image data and compare to a software application operational profile determined based on the list and category of software applications currently executing within an operating system of the AR/MR control modular computing device or any operatively coupled docking station or information handling system as well as current telemetry indicators during such software or firmware execution in generating image display data. Additionally, the hardware processor of an AR/MR control modular computing device in an embodiment at may gather environment or location telemetry such as from ambient light sensing (ALS) readings or location band sensing (LBS) readings to determine location or mobility of the AR/MR control modular computing device and the AR/MR glasses during operation.

For example, in an embodiment described with respect to FIG. 1, the hardware processor 102*a* of the AR/MR control modular computing device 100*a* may further gather resource consumption level readings across the ecosystem of devices, as well as connectivity profiles identifying all input/output (IO) devices operatively coupled to the AR/MR control modular computing device and the types of such connections (e.g., wired or wireless). More specifically, telemetry gathered by the hardware processor 102*a* executing machine readable code instructions 114 of the AR/MR glasses and display device input switching detection system 160 telemetry collection module 161 may identify all processor resources available to the AR/MR control modular computing device 100*a*, via the hardware processor 102*a*, GPU 106, other hardware processors, hardware controllers, or the like within AR/MR control modular computing device 100*a*, the external information handling system hardware processor 102*b*, or any external hardware processors operatively coupled with the AR/MR control modular computing device docking station 150. Telemetry gathered by the hardware processor 102*a* executing machine readable code instructions 114 of the AR/MR glasses and display device input switching detection system 160 telemetry collection module 161 may further identify all memory resources available to the AR/MR control modular computing device 100*a*, via main memory 103, static memory 105, memory drive 115, or any external memory devices, such as that incorporated within or operatively coupled to external information handling system 100*b* or AR/MR control modular computing device 150. Connectivity profiles identifying all input/output (IO) devices 199, 197*a*, or 190, for example, that are operatively coupled to the AR/MR control modular computing device 100*a* and the types of such connections (e.g., wired or wireless) may also be gathered. Additionally, executing software and firmware telemetry may be gathered identifying all currently active software applications for firmware executing to generate display image data on the AR/MR control modular computing device 100*a* or other information handling systems or hardware processing resources (e.g., 150, 100*b*) for display on the AR/MR glasses 190 or the digital display device 197*a*.

At bock 606, the hardware processor of the AR/MR control modular computing device in an embodiment may execute machine readable code instructions of the AR/MR glasses and display device input switching intelligent detection system to input the telemetry readings gathered at block 604 into a trained input switching machine learning model. Such an input switching machine learning model in an embodiment may be trained in a cloud-based platform using telemetry readings crowd-sourced across a plurality of users of AR/MR control modular computing devices, for example. The telemetry readings gathered at block 604 in an example embodiment, as well as then-current display configurations (e.g., AR/MR glasses alone, digital display alone, or combination of both) may be routinely transmitted to such a cloud-based platform to determine patterns correlating various indicators within such telemetry with trends in user-selected display configurations, for example. These various indicators may include, for example, the power availability, indoor or outdoor location, and the actively executing software applications and their software application operational profiles described above in embodiments herein. In some embodiments these indicators may further include the process and memory resources available for use at the AR/MR control modular computing device and connectivity to I/O devices also gathered in telemetry at block 604 above. Upon training of the input switching machine learning model at the cloud-based platform, the model may be transmitted to the AR/MR control modular computing device via a network connection. The hardware processor of the AR/MR control modular computing device in an embodiment may then input all telemetry gathered at block 604 above into the input switching machine learning model to predict a recommended display configuration. The trained input switching machine learning model may execute machine readable code instructions of any of a variety of suitable machine learning models including neural networks, recursive neural networks, machine learning classification engines such as supervised learning, decision trees, gradient boosting, support vector machine, K-nearest neighbor (KNN), or other types of machine learning algorithms.

The hardware processor of the AR/MR control modular computing device in an embodiment at block 608 may execute machine readable code instructions of the trained input switching machine learning model to output a recommended display configuration. As described herein, the recommended display configuration may include display of projected images via the AR/MR glasses alone, display of digital images via the digital display alone, or a combination of both. The input switching machine learning model may output such a determined recommended display configuration based on a prediction of the user's preference of display, given the operational telemetry describing the ecosystem of connected IO devices, power, processor, and memory availability, software application operational profiles describing current usage patterns of software applications, and location of the AR/MR modular computing device, for example.

At block 610, it may be determined whether the trained input switching machine learning model has output a recommended display configuration that includes the AR/MR glasses only, the digital display only, or a combination of both. As described above in further detail at block 504 with respect to FIG. 5, the telemetry gathered at block 604 may describe various usage patterns that indicate a likely user need or preference for one of these display configurations over another. In contrast to the discrete identification of such usage patterns, as performed in FIG. 5 above, the trained input switching machine learning model may make a similar determination based on past user preferences of display configurations made in light of usage patterns inferred based on simultaneously gathered telemetry data, such as that gathered at block 604 above. If the trained input switching machine learning model outputs a recommended display configuration that includes the AR/MR glasses only, the method may proceed to block 612 for orchestrating display of projected images via the AR/MR glasses alone. If the trained input switching machine learning model outputs a recommended display configuration that includes a combination of both the AR/MR glasses and the digital display, the method may proceed to block 614 for the orchestration of display of images at both devices, simultaneously. If the trained input switching machine learning model outputs a recommended display configuration that includes the digital display only, the method may proceed to block 616 for orchestrating the display of images via the digital display alone.

In an embodiment at block 612, in which the trained input switching machine learning model output a recommended display configuration that includes the AR/MR glasses only, the hardware processor of the AR/MR control modular computing device may execute machine readable code instructions of the AR/MR glasses and display device input switching intelligent detection system to orchestrate generation of image display data using hardware processing resources and memory as well as software and firmware drivers limited to display of projected images via the AR/MR glasses, and to cease any previously established transfer of data for display at the operatively coupled digital display device. This may mirror the step described at block 514 of FIG. 5 above, for example. The method may then proceed to block 618 to determine whether the user has manually changed the configuration, or overridden the recommended display configuration output by the trained input switching machine learning model.

At block 614, in an embodiment in which the trained input switching machine learning model output a recommended display configuration that includes a combination of both the AR/MR glasses and the digital display, the hardware processor of the AR/MR control modular computing device may execute machine readable code instructions of the AR/MR glasses and display device input switching intelligent detection system to orchestrate generation of image display data using hardware processing resources and memory as well as software and firmware drivers for display of both projected images via the AR/MR glasses and the display of digital images via the operatively coupled digital display device. This may mirror the step described at block 516 of FIG. 5 above, for example. The method may then proceed to block 618 to determine whether the user has manually changed the configuration, or overridden the recommended display configuration output by the trained input switching machine learning model.

In an embodiment at block 616, in which the trained input switching machine learning model output a recommended display configuration that includes the digital display only, the hardware processor of the AR/MR control modular computing device may execute machine readable code instructions of the AR/MR glasses and display device input switching intelligent detection system to orchestrate generation of image display data using hardware processing resources and memory as well as software and firmware drivers limited to display of digital images via the operatively coupled digital display device, and to cease any previously established transfer of data to the AR/MR glasses for display of projected images. This may mirror the step described at block 518 of FIG. 5 above, for example.

At block 618, it may be determined whether the user has manually changed the configuration, or overridden the recommended display configuration output by the trained input switching machine learning model. This may be done at prompting via a graphical user interface, audio tone, haptics or other indicator by the machine readable code instructions of the AR/MR glasses and display device input switching intelligent detection system of the automatic switching to a recommended configuration. A user may elect to reject the automatic switching or may manually change the display configuration in embodiments herein. The hardware processor executing the machine readable code instructions of the AR/MR glasses and display device input switching intelligent detection system may detect and record this rejection or manual change. As described herein, the trained input switching machine learning model in an embodiment may be trained based on crowd-sourced data indicating previous user preferences for display configurations in various settings described by telemetry data such as that gathered at bock 604 above. If the user has manually changed the configuration suggested by the trained input switching machine learning model, this may indicate a need to retrain the model at the cloud-based platform. As such, if the user has manually changed the configuration, the method may proceed to block 620 for such retraining at the cloud-based platform. If the user has accepted the recommended display configuration, such retraining may not be necessary, and the method may proceed to block 624 to determine whether the AR/MR control modular computing device is still powered on.

In an embodiment at block 620 in which the user has manually changed the configuration suggested by the trained input switching machine learning model, the hardware processor of AR/MR control modular computing device executes machine readable code instructions of AR/MR glasses and display device input switching intelligent detection system to transmit telemetry readings input into machine learning model, outputted recommended display configuration, and user manual change to cloud-based machine learning training platform to retrain machine learning model. This information may be used to retrain the input switching machine learning model to more accurately predict a recommended display configuration that the user is less likely to override in the future.

At block 622, the network interface adapter of the AR/MR control modular computing device in an embodiment may receive and store a retrained and updated machine learning model for future use in more accurately predicting a recommended display configuration. For example, in reference to FIG. 1, upon a retraining of the input switching machine learning model 163 at the cloud-based platform 167, the network interface adapter 130 of the AR/MR control modular computing device 100*a* in an embodiment may receive and store a retrained and updated machine learning model for future use in more accurately predicting a recommended display configuration.

It may be determined at block 624 in an embodiment whether the AR/MR control modular computing device is still powered on. If the AR/MR control modular computing device is still powered on, the method may proceed back to block 604 to gather new telemetry data for determining whether a need for change in display configuration has arisen. By repeating the loop between blocks 604 and 624, the hardware processor of the AR/MR control modular computing device executing machine readable code instructions of the AR/MR glasses and display device input switching intelligent detection system may continuously and automatically adjust the configuration of display devices in current use to include the AR/MR glasses alone, the digital display alone, or a combination of both, based on recommendations output by the trained input switching machine learning model. If the AR/MR control modular computing device has powered down, the method for continuously and automatically adjusting configuration of display devices in current use to include the AR/MR glasses alone, the digital display alone, or a combination of both, based on recommendations output by a trained input switching machine learning model may then end.

The blocks of the flow diagrams of FIGS. 5 and 6 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those capable in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An augmented reality/mixed reality (AR/MR) control modular computing device comprising:

a hardware processor, a memory, and a graphics processing unit (GPU) controlled by machine readable code instructions of an AR/MR glasses and display device input switching intelligent detection system to generate digital display data in three display configurations selected from generating digital display data for operatively coupled AR/MR glasses to display images alone, for an operatively coupled digital display device to display digital images alone, and for both the operatively coupled AR/MR glasses to display projected images and the operatively coupled digital display device to display digital images simultaneously;

the hardware processor executing machine readable code instructions of the AR/MR glasses and display device input switching intelligent detection system to gather initial power state telemetry describing an initial power source available power level for the AR/MR control modular computing device, usage telemetry data indicating an initial software application executing to generate the digital display data having an initial software application operational profile, usage telemetry data indicating software applications and input/output devices used with the AR/MR control modular computing device during execution of the initial software application, and initial location sensor telemetry data of the AR/MR control modular computing device;

the hardware processor executing machine readable code instructions to determine that the initial software application is executing in a productivity mode indicating that a user is working using a plurality of software applications and input/output devices in a user workspace, the AR/MR control modular computing device is indoors from the initial environmental sensor data, and the initial power source is above a threshold power level or an alternating current power source; and the hardware processor of the AR/MR control modular computing device executing machine readable code instructions automatically switch to an initial display configuration to orchestrate generation of the image display data using the GPU and memory to display projected images via the AR/MR glasses and display digital images via the digital display device, simultaneously.

2. The AR/MR control modular computing device of claim 1, wherein the digital image data is generated at an external GPU of an operatively coupled AR/MR control modular computing device docking station.

3. The AR/MR control modular computing device of claim 1, wherein the initial location sensor telemetry data of the AR/MR control modular computing device is determined from an ambient light sensor (ALS) on the AR/MR control modular computing device or on the AR/MR glasses to determine if the AR/MR control modular computing device is indoors or outdoors.

4. The AR/MR control modular computing device of claim 1, wherein the initial location sensor telemetry data of the AR/MR control modular computing device is determined from a location band sensor (LBS) on the AR/MR control modular computing device detecting location based on wireless connection to a wireless network access point to determine if the AR/MR control modular computing device is moving and in a mobile use mode.

5. The AR/MR control modular computing device of claim 4 further comprising:

the hardware processor executing machine readable code instructions to gather updated LBS readings;

the hardware processor executing machine readable code instructions to determine that the AR/MR control modular computing device is outdoors and in mobile mode based on the updated LBS readings; and the hardware processor of the AR/MR control modular computing device executing machine readable code instructions to automatically switch the display configuration to cease display of the digital images via the digital display device and project the digital images via the AR/MR glasses only.

6. The AR/MR control modular computing device of claim 1 further comprising:

the hardware processor executing machine readable code instructions to gather updated power state telemetry indicating that an updated power source is a battery having remaining power below a threshold low power value indicating the user is in a mobile use mode; and the hardware processor of the AR/MR control modular computing device executing machine readable code instructions to automatically switch the display configuration to cease generation of digital display data for display of the digital images via the digital display device and project the digital images via the AR/MR glasses only.

7. The AR/MR control modular computing device of claim 1 further comprising:

the hardware processor executing machine readable code instructions to gather usage telemetry data and software application telemetry data indicating a second software application is executing to generate digital display data with an updated software application operational profile that is a sharing mode profile indicating that the user is collaborating with other individuals; and the hardware processor of the AR/MR control modular computing device executing machine readable code instructions to automatically switch the display configuration to cease display of the projected images via the AR/MR glasses and display the digital images via the digital display device only.

8. The AR/MR control modular computing device of claim 1 further comprising:

the hardware processor executing machine readable code instructions to gather usage telemetry data and software application telemetry data indicating a second software application is executing to generate digital display data with an updated software application operational profile that is a privacy mode profile indicating a need to display information to the user that other, nearby individuals cannot view; and the hardware processor of the AR/MR control modular computing device executing machine readable code instructions to automatically switch the display configuration to cease display of the digital images via the digital display device and project the digital images via the AR/MR glasses only.

9. A method of intelligently switching between display devices at an augmented reality/mixed reality (AR/MR) control modular computing device comprising:

executing, via a hardware processor, machine readable code instructions of an AR/MR glasses and display device input switching intelligent detection system to control a graphics processing unit (GPU) to generate digital display data in three display configurations selected from generating digital display data for operatively coupled AR/MR glasses to display images alone, for an operatively coupled digital display device to display digital images alone, and for both the operatively coupled AR/MR glasses to display projected images and the operatively coupled digital display device to display digital images simultaneously;

executing, via the hardware processor, machine readable code instructions of the AR/MR glasses and display device input switching intelligent detection system to gather initial power state telemetry describing an initial power source available power level for the AR/MR control modular computing device, usage telemetry data indicating an initial software application executing to generate the digital display data having an initial software application operational profile, usage telemetry data indicating software applications and input/output devices used with the AR/MR control modular computing device during execution of the initial software application, and initial location sensor telemetry data of the AR/MR control modular computing device;

executing, via the hardware processor machine readable code instructions, determine from usage telemetry data and software application telemetry data indicating an initial software application is executing to generate digital display data and collaborative input/output devices are being used with the initial software application that a software application operational profile is a sharing mode profile indicating that the user is collaborating with other individuals, that the AR/MR control modular computing device is indoors from the initial environmental sensor data, and that the initial power source is above a threshold power level or an alternating current power source; and automatically switching executing the initial software application via the GPU to an initial display configuration to restrict display of the projected images via the AR/MR glasses and display the digital images via the digital display device only.

10. The method of claim 9, wherein machine readable code instructions of the AR/MR glasses and display device input switching intelligent detection system executed by the hardware processor further executes trained input switching machine learning model algorithm to receive the initial power state telemetry describing the initial power source available power level for the AR/MR control modular computing device, the usage telemetry data indicating the initial software application executing to generate the digital display data having the initial software application operational profile, the usage telemetry data indicating the software applications and the input/output devices used with the AR/MR control modular computing device during execution of the initial software application, and initial location sensor telemetry data and selecting a recommended display configuration from among the three display configurations as output.

11. The method of claim 9 further comprising:

executing machine readable code instructions to gather usage telemetry data and software application telemetry data indicating a second software application is executing to generate digital display data with an updated software application operational profile that is a productivity mode profile indicating that a user is working using a plurality of software applications and input/output devices in a user workspace; and automatically switching the display configuration of executing the second software application via the GPU to display projected images via the AR/MR glasses and display digital images via the digital display device, simultaneously.

12. The method of claim 9 further comprising:

executing machine readable code instructions to gather usage telemetry data and software application telemetry data indicating a second software application is executing to generate digital display data with an updated software application operational profile that is a privacy mode profile indicating a need to display information to the user that other, nearby individuals cannot view; and automatically switching the display configuration of executing the second software application via the GPU to cease display the digital images via the digital display device and to display of the projected images via the AR/MR glasses only.

13. The method of claim 9 further comprising:

executing machine readable code instructions to gather usage telemetry data and software application telemetry data to gather updated power state telemetry indicating that an updated power source is a battery having remaining power below a threshold low power value indicating the user is in a mobile use mode; and automatically switching the display configuration of executing the initial software application via the GPU to cease generation of digital display data for display of the digital images via the digital display device and project the digital images via the AR/MR glasses only.

14. An augmented reality/mixed reality (AR/MR) control modular computing device comprising:

a hardware processor, a memory, and a graphics processing unit (GPU) controlled by machine readable code instructions of an AR/MR glasses and display device input switching intelligent detection system to generate digital display data in three display configurations selected from generating digital display data for operatively coupled AR/MR glasses to display images alone, for an operatively coupled digital display device to display digital images alone, and for both the operatively coupled AR/MR glasses to display projected images and the operatively coupled digital display device to display digital images simultaneously;

the hardware processor executing machine readable code instructions of the AR/MR glasses and display device input switching intelligent detection system to gather initial power state telemetry describing an initial power source available power level for the AR/MR control modular computing device, usage telemetry data indicating an initial software application executing to generate the digital display data having an initial software application operational profile, usage telemetry data indicating software applications and input/output devices used with the AR/MR control modular computing device during execution of the initial software application, and initial location sensor telemetry data of the AR/MR control modular computing device;

the hardware processor executing machine readable code instructions to determine that the initial software application is executing in a software application operational profile that is a privacy mode profile indicating that a user is working using a high security software application and with a high security wired or wireless access to sensitive data for a need to display information to the user that other, nearby individuals cannot view in a user workspace, the AR/MR control modular computing device is indoors from the initial environmental sensor data, and the initial power source is above a threshold power level or an alternating current power source; and the hardware processor of the AR/MR control modular computing device executing machine readable code instructions to automatically switch to an initial display configuration to restrict display of the digital images via the digital display device and project the digital images via the AR/MR glasses only.

15. The AR/MR control modular computing device of claim 14, wherein the digital image data is generated at an external GPU of an operatively coupled AR/MR control modular computing device docking station.

16. The AR/MR control modular computing device of claim 14, wherein the initial location sensor telemetry data of the AR/MR control modular computing device is determined from an ambient light sensor (ALS) on the AR/MR control modular computing device or on the AR/MR glasses to determine if the AR/MR control modular computing device is indoors or outdoors.

17. The AR/MR control modular computing device of claim 14, wherein the initial location sensor telemetry data of the AR/MR control modular computing device is determined from a location band sensor (LBS) on the AR/MR control modular computing device detecting location based on wireless connection to a wireless network access point to determine if the AR/MR control modular computing device is moving and in a mobile use mode.

18. The AR/MR control modular computing device of claim 14 further comprising:

the hardware processor executing machine readable code instructions to gather usage telemetry data and software application telemetry data indicating a second software application is executing to generate the digital display data with an updated software application operational profile that is a sharing mode profile indicating that the user is collaborating with other individuals; and the hardware processor of the AR/MR control modular computing device executing machine readable code instructions to automatically switch the display configuration to cease display of the projected images via the AR/MR glasses and display the digital images via the digital display device only.

19. The AR/MR control modular computing device of claim 14 further comprising:

the hardware processor executing machine readable code instructions to gather usage telemetry data and software application telemetry data indicating a second software application is executing to generate digital display data in a productivity mode indicating that a user is working using a plurality of software applications and input/output devices in a user workspace; and the hardware processor of the AR/MR control modular computing device executing machine readable code instructions automatically switch the display configuration to orchestrate generation of the image display data using the GPU and memory to display projected images via the AR/MR glasses and display digital images via the digital display device, simultaneously.

20. The AR/MR control modular computing device of claim 14 further comprising:

the hardware processor executing machine readable code instructions to gather updated location sensor telemetry data;

the hardware processor executing machine readable code instructions to determine that the AR/MR control modular computing device is outdoors or in mobile mode based on the updated location sensor telemetry data; and the hardware processor of the AR/MR control modular computing device executing machine readable code instructions to automatically switch the display configuration to cease display of the digital images via the digital display device and project the digital images via the AR/MR glasses only.

* * * * *